US009100361B1

(12) United States Patent
Lucchesi et al.

(10) Patent No.: US 9,100,361 B1
(45) Date of Patent: Aug. 4, 2015

(54) SECURE ROUTING MODULE

(75) Inventors: Frank A. Lucchesi, Burnsville, MN (US); Christopher T. Wolff, Shoreview, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 2103 days.

(21) Appl. No.: 12/109,973

(22) Filed: Apr. 25, 2008

(51) Int. Cl.
*H04L 29/00* (2006.01)
*H04L 29/06* (2006.01)

(52) U.S. Cl.
CPC ..................................... *H04L 63/00* (2013.01)

(58) Field of Classification Search
USPC ................................................. 713/150–153
See application file for complete search history.

(56) References Cited

U.S. PATENT DOCUMENTS

| | | | |
|---|---|---|---|
| 5,898,776 A * | 4/1999 | Apland et al. | 326/8 |
| 6,072,994 A * | 6/2000 | Phillips et al. | 455/84 |
| 6,889,385 B1 * | 5/2005 | Rakib et al. | 725/119 |
| 7,468,980 B1 * | 12/2008 | Casto et al. | 370/395.52 |
| 7,603,716 B2 | 10/2009 | Frank et al. | |
| 7,809,673 B2 | 10/2010 | Impson et al. | |
| 7,894,952 B2 | 2/2011 | Donovan et al. | |
| 2002/0142797 A1 | 10/2002 | Tarighi et al. | |
| 2003/0018453 A1 | 1/2003 | Carrick | |
| 2004/0160324 A1 | 8/2004 | Stilp | |
| 2004/0172658 A1 * | 9/2004 | Rakib et al. | 725/120 |
| 2004/0176128 A1 | 9/2004 | Grabelsky et al. | |
| 2005/0180397 A1 * | 8/2005 | Yeom | 370/352 |
| 2006/0209828 A1 | 9/2006 | Ng et al. | |
| 2007/0060305 A1 | 3/2007 | Amaitis et al. | |
| 2007/0110054 A1 | 5/2007 | Kozakai et al. | |
| 2007/0140152 A1 | 6/2007 | Allen et al. | |
| 2007/0220109 A1 * | 9/2007 | Nelson et al. | 709/218 |
| 2007/0250708 A2 | 10/2007 | Holden et al. | |
| 2007/0286311 A1 | 12/2007 | Coyne et al. | |
| 2008/0069347 A1 | 3/2008 | Brown et al. | |
| 2008/0120366 A1 | 5/2008 | Donovan et al. | |
| 2008/0181394 A1 | 7/2008 | Keefe et al. | |

OTHER PUBLICATIONS

Co-Pending U.S. Appl. No. 12/109,867, filed Apr. 25, 2008.
Co-Pending U.S. Appl. No. 12/109,937, filed Apr. 25, 2008.

* cited by examiner

*Primary Examiner* — Jeffrey Pwu
*Assistant Examiner* — Helai Salehi
(74) *Attorney, Agent, or Firm* — Hamre, Schumann, Mueller & Larson, P.C.

(57) ABSTRACT

A routing module in a secure routing and communication architecture to receive and transmit data of varied protocols, convert the data protocols to an internet protocol for routing on a local area network. Components of the input/output module comprise a processor, a cryptomodule, a field programmable gate array, all of which communicate in internet protocol. The routing module has a number of interfaces through which SATCOM protocol, UHF-VHF protocol, digital data protocols, serial data protocols, common data link protocols, push-to-talk data protocols, analog voice and voice internet protocol, and other internet protocol data can be received, routed, and transmitted. Hardware, firmware, and software logic within the components convert analog or other digital data to internet protocol, verify the classification level of data, protect the classification level of the data, encrypt the data for routing through a secure routing system a destination interface.

29 Claims, 12 Drawing Sheets

SECURE ROUTING MODULE

FIELD

This invention relates generally to communication systems and, more particularly, relates to a secure input/output routing module having programmable electronic components for receiving and routing data different analog, digital and internet protocols all the while preserving the security level of the information for communications between space craft, satellites, ocean vessels, ground stations and manned and unmanned aircraft and vehicles.

BACKGROUND

Communications between satellite, sea, air, and ground communication devices have made our world seem smaller and smaller. Increasingly so, moreover, worldwide communications are in an internet protocol such as TCP/IP, UDP, IPV-6 and those protocols that are backwards compatible. There are, however, older, reliable, and very expensive communication devices, called legacy devices that do not transmit and/or receive data in an internet protocol. Examples of such legacy devices include radio communications, satellite communications (SATCOM), and telecommunications that include Wide Bandwidth Satellite Communications (WB SATCOM), Narrow Bandwidth Satellite communications (NB SATCOM), Common Data Link, (CDL), Very High Frequency (VHF)/Ultra High Frequency (UHF) Line of Sight (LOS) Radio Communications. Communication devices, e.g., airplanes, ocean-going vessels, Hum-Vees, motorcycles, etc., moreover, are mobile and some, like satellites, are constantly in motion. Data communicated between these devices also have different information sensitivity levels from top secret national security or military information to public general weather information in different languages.

To illustrate the complexity of these communications, an analysis of one type of communication system is presented as the background herein—manned aircraft to ground control. This will familiarize the reader with the different hardware involved in world-wide communications, the software or data processing of these communications that occurs both on the ground and in the air, different industry specifications and standards involved, different protocols, the different signals, etc. Keep in mind that this example is only between a manned aircraft and a ground station; there are also communications between aircraft and aircraft, watercraft, both from the surface of the water and submarines, satellites, ground control stations, ground mobile stations, unmanned aerial and ground vehicles, manned ground vehicles, space stations, etc.

Currently, there are three networks through which an aircraft can communicate with ground control: VHF, SATCOM, and HF. A network of VHF radio ground stations ensure that aircraft can communicate with ground stations in real-time. VHF communication is line-of-sight and the typical VHF range is dependent on altitude with a 200-mile transmission range common at high altitudes; thus, VHF communication is applicable only over landmasses which have a VHF ground network installed. SATCOM, on the other hand, provides worldwide coverage except at the high latitudes such as over the poles. SATCOM refers to satellite communications and airborne SATCOM equipment includes a satellite data unit, a high power amplifier, and an antenna with a steerable beam. High Frequency (HF) datalink is a relatively new network responsible for maintaining communication of aircraft on polar routes with ground based systems.

Aircraft Communication Addressing and Reporting System (ACARS) refers to a complete air and ground digital datalink system for transmission of small messages between aircraft and ground stations via radio or satellite using telex formats. As air traffic increases, however, ACARS will no longer have the capacity or flexibility to handle the large amount of datalink communications so an Aeronautical Telecommunications Network (ATN) protocol will replace ACARS and provide services such as authentication, security, and a true internet protocol working architecture. In many cases, the voice-relayed information involves dedicated radio operators and digital messages sent through an ATN to an airline teletype system or its successor system.

There are three major parts of the ACARS datalink system: (a) aircraft equipment; (b) a service provider; and (c) a ground processing system. The heart of the datalink system on board the aircraft is the ACARS Management Unit, referred to herein as the avionics computer; newer versions are referred to as a communications management unit and defined in ARINC Characteristic 758. The avionics computer is designed to send and receive digital messages from the ground using existing VHF radios. Messages that are sent to the ground from the avionic computer are referred to as downlink messages; messages transmitted to an aircraft or other system are called uplink messages. Aircraft equipment also consists of airborne end systems that are the source of ACARS downlinks and the destination for uplinks, such as the Flight Management System (FMS), a datalink printer, a maintenance computer, and the cabin terminal. The avionics computer is also a router that routes a downlink message through the most efficient air-ground subnetwork. Of course, a communications avionics computer may also be an end system for certain messages. The aircraft may also have a multifunction control display unit that is a text-only device that displays messages to the aircrew and accepts crew input on an integrated keyboard. Standards for the display unit are defined in ARINC Characteristic 739 to have seven input ports and can be used with seven different systems, such as avionics computer or flight management system.

The ground end system is the destination for downlinks, and the source of uplinks. On the ground, the ACARS system is a network of radio transceivers that receive and transmit messages, as well as route the messages to various airlines on the network. Of course, there were and are many standards promulgated by the telecommunications and airline industry with which the equipment and the communication must comply, such as the ARINC 758 for avionics computers. Generally, ground end systems are military and government agencies such as CAA/FAA, or airline operations headquarters to provide air traffic services such as clearances, etc. Airline operations provide the information necessary for operating the airline efficiently, such as gate assignments, maintenance, passenger needs, etc. In the beginning most airlines created their own legacy host systems for managing their ACARS messages but now several off-the-shelf products manage the ground hosting and enable an end user to receive downlinks, send uplinks, reformat messages, distribute messages, track communications and much more. There is also a capability for collating, parsing and reformatting ACARS messages for delivery into airline systems and then provide a return path via the ACARS networks to the originating or other aircraft in the fleet; this capability has been extended into the eFlight concept for integrated airlines operations.

Typical datalink functions include: (1) flight management that sends flight plan change requests, position reports, receives clearances, controller instructions, etc.; (2) printers that may automatically print an uplink message; (3) and maintenance computer(s) that may downlink diagnostic messages. In advanced systems, in-flight troubleshooting can be conducted by technicians on the ground using datalink messages to command diagnostic routines in the maintenance computer and analyzing the downlinked results. There is also a (4) cabin terminal to communicate special needs of passengers, gate changes due to delays, catering, etc. In addition, the router function built into the avionics computer determines which subnetwork to use, i.e., HF, VHF, or SATCOM, when routing a message from the aircraft.

ACARS messages may be of three types: (a) Air Traffic Control (ATC) messages, defined in ARINC Standard 623, used by aircraft crew to request clearances, and by ground controllers to provide those clearances; (b) Aeronautical Operational Control (AOC) and (c) Airline Administrative Control (AAC), to communicate between the aircraft and its base, whose avionics computers and hardware may be proprietarily defined by the users but must meet at least the guidelines of ARINC Standard 618, or may be standardized according ARINC Standard 633. ACARS is programmed to automatically detect and report changes occurring during the major flight phases, i.e., Out of the gate, Off the ground, On the ground and Into the Gate (OOOI), by monitoring sensors on the aircraft. In addition to detecting OOOI events on the aircraft and sending messages automatically to the ground, the systems were expanded to support new interfaces with other on-board avionics to include a datalink interface between the ACARS avionics computers and flight management systems for transmission and receipt of flight plans and weather information. Now flight management systems are updated in flight, and new weather conditions or alternate flight plans are evaluated in real time.

Other messages include fuel consumption, engine performance data, and aircraft position as well as free text data. Typically, a SATCOM installation supports a datalink channel as well as several voice channels. Messages are sent to the ground from other on-board systems. As an example, algorithms of a flight data acquisition and management system (FDAMS) analyze engine, aircraft, and operational performance conditions and provide real-time data to a maintenance crew on the ground, examples of which include monitoring engine exceedance conditions during flight such as checking engine vibration or oil temperature exceeding normal operating conditions. Abnormal flight conditions and detailed engine reports for engine trending enable airlines to better monitor engine performance and identify and plan repair and maintenance activities while the aircraft was still in flight. Furthermore, a control display unit located in the cockpit allows the flight crew to send and receive messages similar to today's email, e.g., requesting weather information and ambulance services for passenger becoming ill. Some responses are automatic, such as ground computers transmitting the requested weather information back to the ACARS avionics computer, which could then be displayed and/or printed; of course, others such as medical emergencies may be communicated over SATCOM voice protocols. Airlines have added new messages to support new applications, such as weather, winds, clearances, connecting flights, etc. so that the ACARS systems have been customized to support airline unique applications, and unique ground computer requirements, resulting in each airline having their own unique ACARS application operating on their aircraft. Some airlines have more than 75 display units or monitors for their flight crews, where other airlines may have only a dozen different screens. In addition, because each airline's ground computers may be different, the contents and formats of the messages sent by an ACARS avionics computer are different for each airline. Military aircraft, moreover, may have much higher security and stricter data requirements than commercial airlines.

The ACARS avionics computer sends a message to one of the existing HF, SATCOM or VHF radios as selected by logic within the avionics computer. For a message over the VHF network, an on-board radio would transmit the VHF signals to be received by a VHF ground station. The majority of ACARS messages are typically only 100 to 200 characters in length and such messages are made up of a one-block transmission from (or to) the aircraft. One ACARS block is constrained to 220 characters within the body of the message. For downlink messages which are longer than 220 characters, the ACARS unit will split the message into multiple blocks, currently no more than 16, and transmit each block to the ground station. For these multi-block messages, the ground station collects each block until the complete message is received before processing and routing the message. The ACARS avionics computer also contains protocols to support retry of failed messages or retransmission of messages when changing service providers.

Once the ground station receives the complete message from an aircraft, the ground station forwards the message to the datalink service provider. The datalink service provider delivers the message from the aircraft to the ground end system, and vice versa. Because the ACARS network is modeled after the point-to-point telex network, all messages go to a central processing location or the datalink service provider's main computer system. The datalink service provider routes the message to the appropriate end system using its network of landlines and ground stations. The datalink service provider uses information contained in a routing table to process the message by identifying each aircraft and the type of messages and then forwards the message to the airlines or other destinations.

There are currently two primary datalink service providers of ground networks in the world, ARINC and SITA, although specific countries have implemented their own network with the help of either ARINC or SITA. Until recently, each area of the world was supported by a single service provider but now both ARINC and SITA are competing and installing networks in the same regions. ARINC operates a network in North America, and have also recently started operating a network in Europe. ARINC has also assisted the CAAC in China, as well as Thailand and South America with the installation of VHF networks. SITA has operated the network in Europe, Middle East, South America and Asia for many years and have also started a network in the US to compete with ARINC.

Each airline must tell its service provider(s) what messages and message labels their ACARS systems will send, and for each message, where to route the message. The service provider then updates their routing tables. Correlating a label within the message header with the routing table, the datalink service provider forwards the message to the airline's computer system. The transmission time from when the flight crew presses the send key to send the message, to the time that it is processed within an airline's computer system varies, but is generally on the order of six to fifteen seconds.

For a message to be transmitted from the ground to the aircraft, i.e., an uplink message, the process is nearly a mirror image of how a downlink is sent from the aircraft. For example, in response to an ACARS downlink message requesting weather information, a weather report may be automatically constructed and sent by the airline's computer system. The message contains the aircraft registration number in the header of the message with the body of the message containing the actual weather information. This message is sent to the datalink service provider's main computer system. The datalink service provider transmits the message over their ground network to a VHF ground station in the vicinity of the aircraft. The ground station broadcasts the message over the VHF frequency. The on-board VHF radio receives the VHF signal and passes the message to the communications avionics computer having an internal modem that transforms the signal into a digital message. The avionics computer validates the aircraft registration number, and processes the message. The processing performed on the uplink message by the avionics computer depends on the specific airline requirements. In general, an uplink is either forwarded to another avionics computer, such as in-flight management system or FDAMS, or is processed by the on-board avionics computer.

Presently, each communication system is an independent network with redundant hardware, if necessary, including multiple different interfaces with different data. SATCOM communication has its own hardware and software; VHF communication has its own hardware and channels. Often, the VHF and UHF radios are not connected to other communication interfaces. What is needed then is a single integrated architecture that allows world-wide and local communications to be converted in and out of internet protocol. Also, with the increased communications, it is imperative that any inherent and recognizable security level of the information be preserved.

Further, what is required is a dynamic and automated method and service that converts non-internet protocol data and routes this data over a network having both secure and nonsecure lines and devices. These needs and other that will become apparent are solved by the invention as stated below:

SUMMARY

Described herein is a routing module connected to receive and transmit data in a plurality of protocols that includes a cryptographic key component to verify a classification level of data; an encryption component to encrypt data for routing through the input/output module; and a conversion component to convert received data to an internet protocol for routing through the input/output module. The routing module further comprises one or more interfaces for receiving and transmitting data, having at least one interface for each protocol. Examples of the protocols received and transmitted by the interfaces include wideband and narrowband SATCOM, VHF-UHF analog radio communications, voice internet protocol, serial digital data, analog audio data. A computer processor having a real-time operating system on the routing module may comprise and execute the conversion component and the encryption component. The cryptographic key component includes logic operations and a field programmable gate array connected to the computer processor, and a cryptomodule connected to the field programmable gate array.

Further described is an input/output module for routing and communicating data, comprising a plurality of interfaces to receive and transmit data in a plurality of source and destination protocols, at least one interface configured to receive and transmit data for each of the source and destination protocols; at least one cryptographic key identifier to determine, verify, and preserve a security level of classified data received and transmitted by the input/output module; a first data protocol converter to convert data from a source protocol to an internet protocol; at least one encryptor to encrypt data; at least one decryptor to decrypt data; and a second data protocol converter to convert data from an internet protocol to a destination protocol.

Details of the embodiments summarized can be visualized with references to the following figures.

DETAILED DESCRIPTION

This application is related to the following applications, which have been assigned to the same entity and which are hereby incorporated by reference in their entireties: U.S. patent application Ser. No. 12/109,867 entitled Secure Communication System, filed the same day, and U.S. patent application Se. No. 12/109,937 entitled Method for Securely Routing Communications, filed the same day. The embodiments are disclosed with reference to the drawings described above; however, the invention may be embodied in many different forms and should not be construed as limited to the embodiments set forth herein. Rather the illustrated embodiments are provided so that this disclosure is thorough and complete, and fully conveys the scope of the invention to those skilled in the art. Like numbers refer to like hardware and software components throughout.

As will be appreciated by one of skill in the art, the embodiments described herein include an architecture having both hardware and software installed in an aircraft, and mobile and stationary ground stations to dynamically convert data to an internet protocol while preserving the sensitivity level of the information. The architecture and system may be an entirely hardware embodiment, an entirely software embodiment so long as hardware interfaces are available and connectable or, preferably, an embodiment combining software and hardware components.

Figure 1:
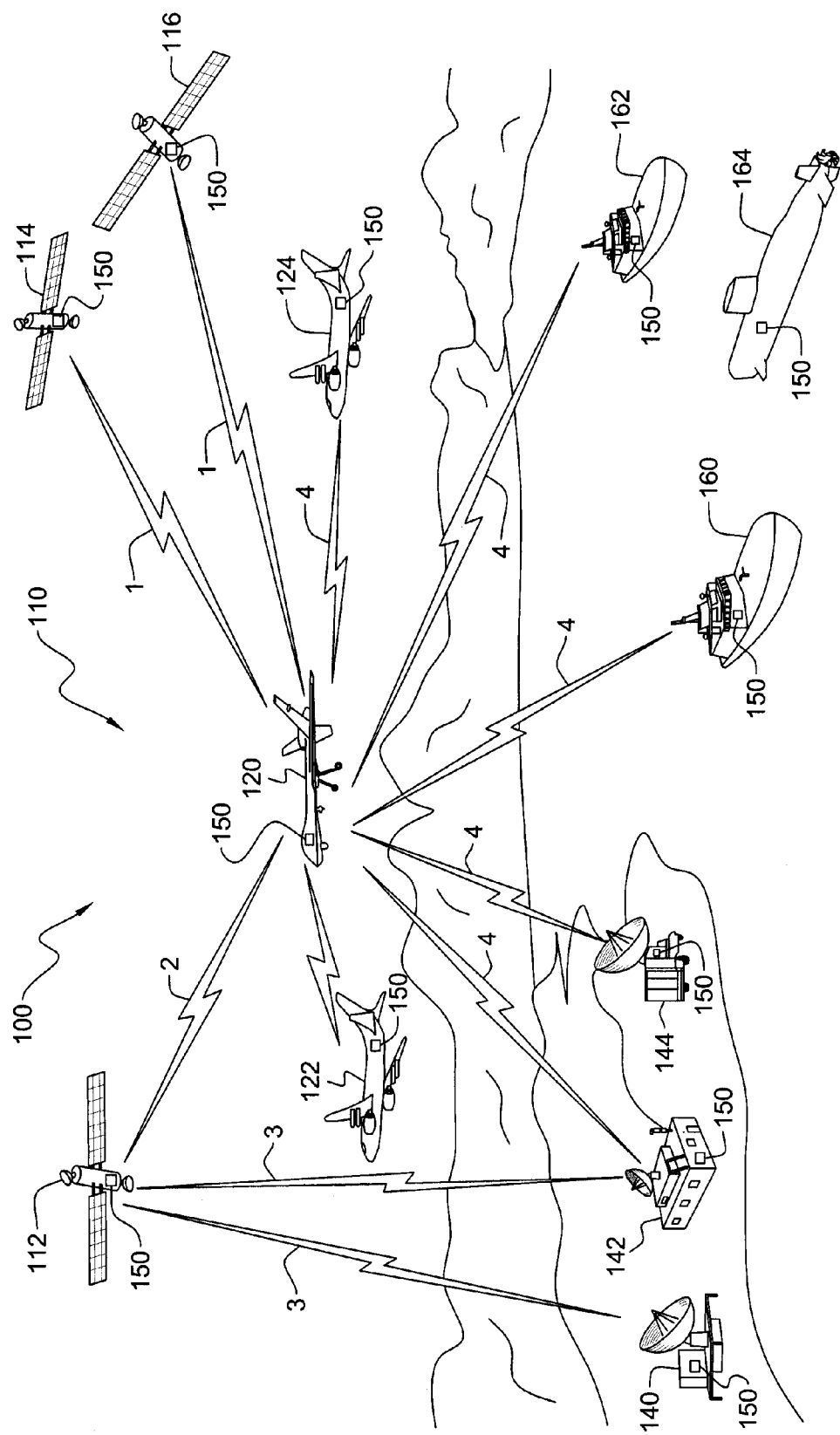
FIG. 1 is a pictorial representation of a global information grid wherein the communications infrastructure can take advantage of embodiments described herein.

FIG. 1 is a high-level block diagram of a global information grid 100 having the secure routing and communication architecture 110 in accordance with the preferred embodiments described herein. In the global information grid 100, multiple communications occur between a number of communicating entities or stations, shown in FIG. 1 as satellites 112, 114, 116, manned aircraft 122, 124, unmanned aircraft 120, fixed and mobile ground stations 140, 142, 144, and one or more ocean-going vessels 160, 162, 164. The unmanned aircraft 120 and a fixed ground station or other communicating entity may share the same control system and as such, those two or three communication entities that share a same control system may be considered a closed communication loop. Lines of communications are shown in FIG. 1 as being transmitted to and from unmanned aircraft 120 but, of course, one of skill in the art appreciates that communications can occur between any two or more of the communicating entities. Moreover, the global information grid 100 is not intended to be limited to the communicating entities shown, e.g., trains and freshwater craft are not shown but can also be communications entities. Satellite communications may be on narrowband (NB SATCOM) or on international maritime (INMARSAT) channels or on a mobile user objective system (MUOS) UHF, as shown by ①. Satellite communications also occur along different channels ② having radar wideband communications of various microwave frequencies. Communication channels ③ and ④ may represent Common Data Link (CDL) of the same or different radio frequencies. These channels or bandwidths are not intended to be limitative of the global information grid 100 or of the capacities of the secure routing and communication architecture 110. As explained in the background, communications occur in various protocols wherein a protocol refers to a particular frequency, power strength, voltage level of a signal and, in the case of a digital signal, an arrangement of bits or voltages of the signal. Communications between ground, air, ocean, and satellite stations or entities all have different levels security information, proprietary information, or the communications may be unsecured.

Communication stations or entities on the ground 140, 142, 144 and manned aircraft 122, 124, and unmanned aircraft 120 preferably have hardware and software components either connected to the entity or embodied in a secure chassis 150 within or connected to the entity whereby functions of the secure routing and communication architecture 110 to route communication, convert communications to internet protocol, and preserve the security level of the communications, as explained herein, are implemented.

Figure 2:
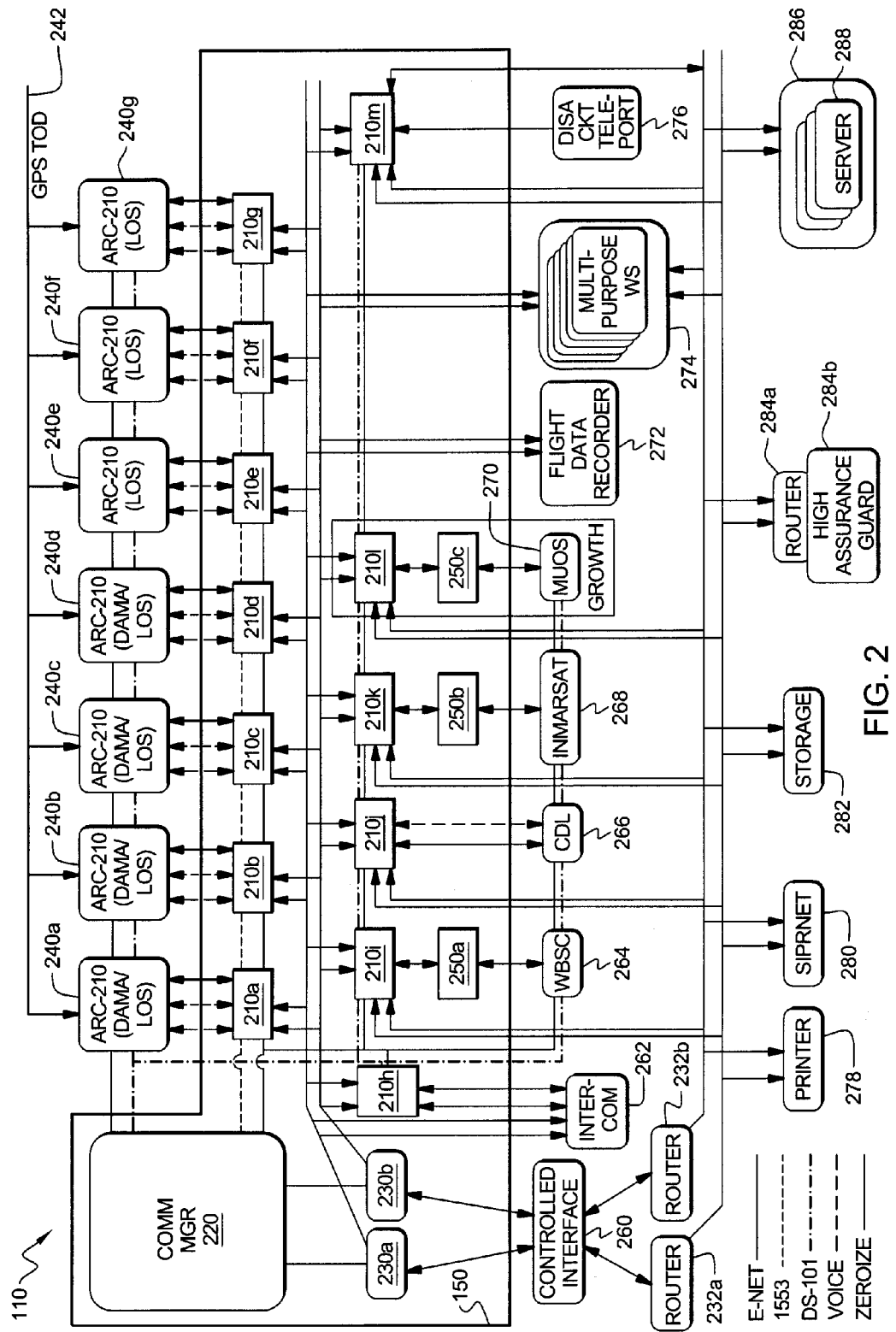
FIG. 2 is a block diagram of a secure routing and communication architecture in accordance with embodiments described herein.

FIG. 2 is a block diagram of a generic secure routing and communication architecture 110. This generic secure routing and communication architecture 110 may have different ones of the following described components, modules and elements depending upon whether the architecture 110 is used in a manned or an unmanned environment, air, satellite, ship, space station, ground. FIG. 2 is thus intended to be representative and not limitative of the various systems, modules and components that can be included in or connected to the secure routing and communication architecture 110. In general the generic secure routing and communication architecture 110 comprises a number of interfaces 240, 260, 262, 264, 266, 268, 270, 272, 277, 276, etc., some of which may be modems, for receiving data of various protocols, a plurality of trusted input/output modules 210, one or more communication manager processors 220, one or more routers 230, and one or more security processors 250, some or all of which may be mounted in a secure chassis 150.

The different analog and digital, voice, video, optic data interfaces 240, 260, 262, 264, 266, 268, 270, 272, 277, 276, etc., connect to the secure routing and communication architecture 110 to upload/uplink and download/downlink different protocols and security levels of information. The secure routing and communication architecture 110 preserves not only the data but also the level of information as it converts each format between internet protocol and its respective analog, serial, voice, video, optic information format. In some instances, it is preferable to separate and isolate particular modules for particular internet protocols in order to minimize risk or operational failure in critical remote environments. Among the various signal protocols and interfaces 240, 260, 262, 264, 266, 268, 270, 272, 277, 276, etc., that can be implemented are listed here by way of example only and are not to be construed as being limiting, are internet protocol such as Ethernet, digital and analog busses such at 1553 and RS-422, a high definition serial digital cable such as HD-SDI, analog voice and video such as NTSC, and DS-101. Each module, component, element, process step, and feature of the architecture 110 will be discussed.

A plurality of trusted input/output modules 210 receive communications arising from a number of transmitting communicating entities/sources through interfaces 240, 260, 262, 264, 266, 268, 270, 272, 277, 276, etc., in a variety of protocols, convert the communications to an internet protocol, route the messages through the secure routing and communication architecture 110 on a local area network (LAN) to a destination trusted input/output module 210, verify the security level of the message and the source and destination of the message, convert the internet protocol communication to a protocol of the destination, and then route the message to the interface 240, 260, 262, 264, 266, 268, 270, 272, 277, 276, etc., connected to the destination outside a secure chassis 150 and perhaps beyond the secure routing and communication architecture 110. The trusted input/modules 210 are preferably housed in a secure chassis 150. As illustrated in FIG. 2, trusted input/output modules 210a-210g are connected to VHF/UHF transceivers 240a-240g, each of which is capable of receiving and routing unsecure or encrypted radio data according to its individual configuration. Among the data protocols that can be exchanged between the radio transceivers 240a-240g and the trusted input/output modules 210a-210g are analog voice and encrypted data and data on the 1553 serial bus standard. Each respective trusted input/output module 210 converts the received radio data to an internet protocol, indicated as an Ethernet connection, which is then routed on an internal bus to one or more routers 230a, 230b or security processors 250a, 250b, such as HAIPEs, or to other trusted input/output modules 210h-210m, preserving the security level of the routed information.

An integral part of the secure routing and communication architecture 110 is the communication manager 220, a data processing device and system capable of controlling and managing many functions of the secure routing and communication architecture 110. Communication manager 220 is shown as being included in the secure chassis 150 but one of skill in the art can appreciate that the communication manager 220 can also be connected to the secure chassis 150 remotely or through a wireless connection. Processes of the communication manager 220 may also be distributed across various processors in a network. The communication manager 220 manages the control flow of information and routing of data in the secure routing and communication architecture 110. A communication manager 220 may also function as a domain name system/server for internet protocol communications.

The communication manager 220 of the securing routing and communication architecture 110 provides automatic and dynamic reassignment of data links and data rates based on dynamic quality of service and other considerations. In addition, signal strength is maximized by intelligently steering the directional antennas communicated to the antenna control by the communication manager 220. Other functions and capabilities of the communication manager 220 include: dynamic link management; monitoring and management of waveforms/bandwidth based on operational and or environmental conditions; management of communication equipment for allocation of communications equipment and data routing including line-of-sight or cross-link combination of beyond-line-of-sight and line-of-sight links; management of dynamic channel/frequency by assigning communications equipment channels to minimize radio frequency interference, e.g., harmonics, spur, while operating communications, navigation, identification and sensors simultaneously.

With respect to military and other systems connected to military entities, communication manager 220 manages sensor data in order to coordinate link availability throughput with a ground mission sensor processor in 142, 144 of FIG. 1. Communication manager 220 also determines sensor data bandwidth size, compression and frequency, frame rates, etc. The communication manager 220 further manages and controls data link systems both at the distributed common ground system and airborne control system.

Communication manager 220 further manages communication equipment classification level; classification configuration of communication equipment; management of encryption keys; and distribution of black keys and zeroise functions. The communication manager 220 functions as the key manager; tracks and accounts for cryptographic keys; issues zeroising commands for the cryptographic keys and clears communication presets. The communication manager 220 loads algorithms into the cryptomodules 480 on the trusted input/output modules 210. Data of different security levels can coexist within the secure routing and communication architecture 110 when the data is keyed appropriately; this is realized by tunneling data of one security level through a data link with a different security classification. The zeroisation signal may be generated by the communication manager 220 or may originate remotely from a remote command system by operational software or by a control panel connected to the secure routing and communication architecture 110. Zeroisation erases sensitive parameters that are not necessarily but can be cryptographic information such as cryptographic keys, plaintext and/or some intermediate values from a cryptographic module to prevent their disclosure if the equipment is captured or moves outside a security boundary. Zeroisation not only erases but may also change the value within a system to some fixed, meaningless value. Zeroisation is typically performed at the end of an encryption session to prevent accidental disclosure of the keys, or immediately when there was a risk of capture or intrusion by an adversary. Zeroisation may also be performed when an application changes a user, privileges, or mode, e.g., to a test mode or user, on termination, on any error condition, upon user request, immediately, the last time the parameter is required; and possibly if a parameter has not been required for some time, and upon evidence of tampering. Over-the-air rekeying of the radios provides key management interoperability with other existing platforms. Preferably, the secure routing and communication architecture 110 is capable of cold zeroisation meaning that it can zeroise itself through the communication manager 220 without its normal power supply enabled.

The communication manager 220 also provides real-time data link status and management to a manned aircraft 122, 124 of FIG. 1, i.e., a pilot, or to a distributed common ground systems or entities 142, 144 of FIG. 1 through graphical interfaces generated by software components that may be provided by the communication manager 220. Link status information, such as receiver signal strength, or other decision aids provided to a pilot or to other decision-making individuals or functions in the system assist with selecting an available link and reconfiguring degrading links.

A discussion of the various input/output communication entities transmitting messages to and receiving messages from the secure routing and communication architecture 110 is now appropriate. There may be a VHF/UHF radio communication system or entity 240 having a number of radio transceivers 240a through 240g located throughout the world and on various aircraft, watercraft, ground stations or entities. This VHF/UHF radio communication system 240 is capable of receiving and transmitted global positioning and time-of-day data 242 and other secure, proprietary, and unsecure data that may or may not be in interne protocol. Radio transceivers 240a-242g may be part of multimode integrated communications system that provides multimode voice and data communications in either normal or jam-resistant modes in line-of-sight (LOS) or satellite communications (SATCOM) modes. One such radio transceiver, an AN/ARC-210(V), establishes bidirectional communication links over the 30 to 400 MHz frequency range within tactical aircraft environments. These transceivers may also be equipped for Demand Assigned Multiple Access (DAMA) that dynamically allocates and shares bandwidth of communication links or circuits within a satellite transponder space. Thus, each radio transceiver 240a-240g may be in communication with other radio entities connected to the same or other secure routing and communication architectures 110.

Other communication interfaces of the secure routing and communication architecture 110 may include an Intercom 262, a wideband satellite communications (WBSC) interface 264, a common data link (CDL) adapter 266, an international maritime satellite communications (INMARSAT) interface 268, a mobile user object system (MUOS) interface 270. The MUOS is an array of satellites that provide global narrowband satellite communications, e.g., at and below 64 kilobits per second at 300 megahertz to 3 gigahertz Ultra High Frequency (UHF). The secure routing and communication architecture 110 may further output data to a flight data recorder 272 or the same or other data to one or more multipurpose workstations 274. A defense intelligence agency information systems architecture (DISA) Ckt Teleport interface 276 may also be connected to the secure routing and communication architecture 110 via internet protocol. Data that has been digitized and whose sensitivity has been preserved by the secure routing and communication architecture 110 can be output to a printer 278, a secret internet protocol router network (SIPRNET) 280, mass storage 282, other routers 232a, 232b, 284a, 284b or a computer network 286 having one or more servers 288, such as for multimedia conferencing systems. One of skill in the art will understand that these interfaces, communication modes and formats, and entities represent only one embodiment; other embodiments may have more, less, or different interfaces.

Figure 3:
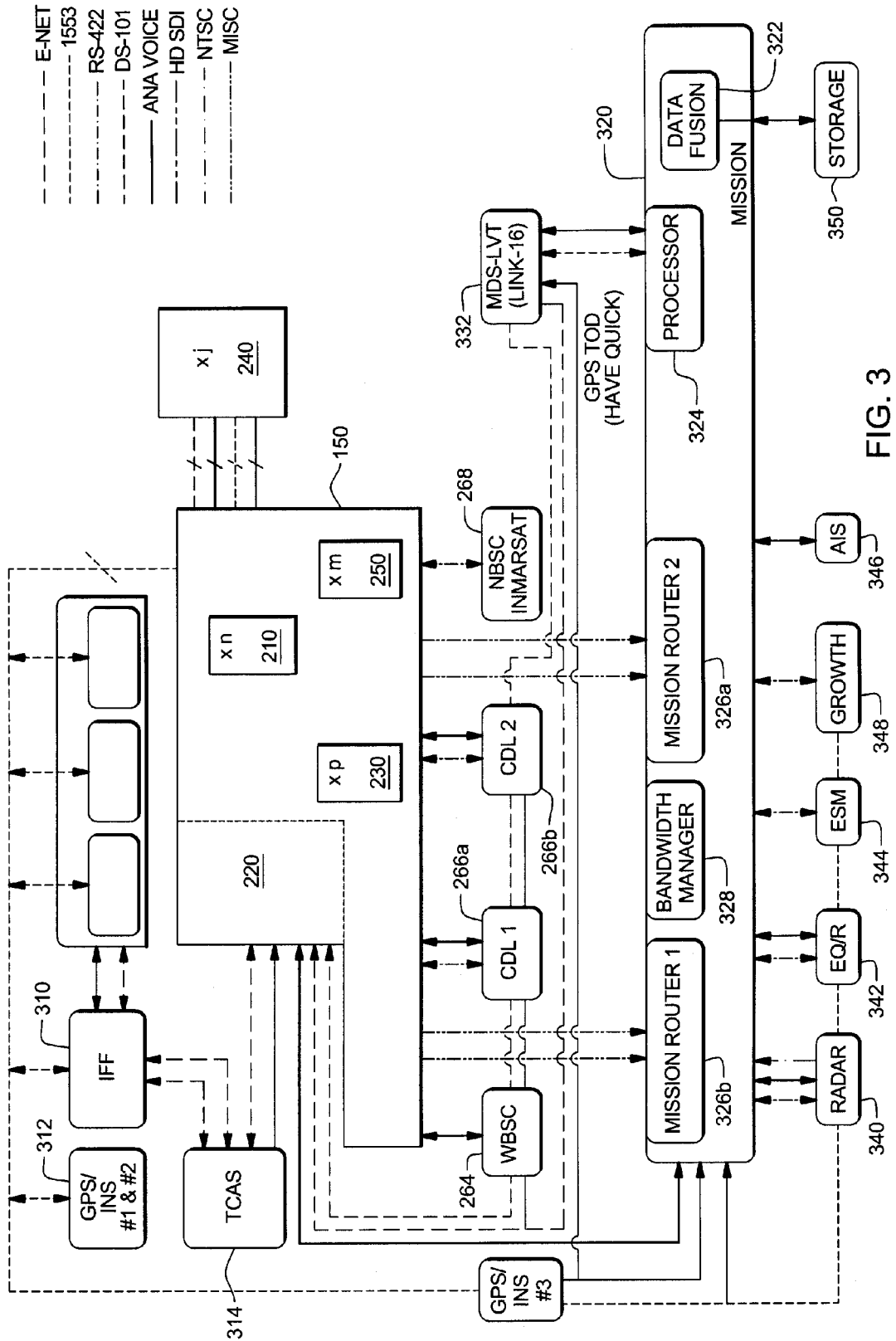
FIG. 3 is a block diagram of a secure routing and communication architecture in accordance with embodiment described herein for communicating entities sharing the same control system.

FIG. 3 is a simplified block diagram of the secure routing and communication architecture 110 that can be used when both the transmitting and the receiving entity share the same control system, such as an unmanned aircraft 120 or unmanned environment in communication with a remote ground, naval, or air-based mission command system 320. Most of the various protocols and the components, modules, elements of the secure routing and communication architecture 110 in a manned environment, as in FIG. 2, are the same as the secure routing and communication architecture 110 in an unmanned environment. In either environment, the communication manager 220 may be located outside the secure chassis 150 but still share the same control system, i.e., on the aircraft or the ship, and connected to a secure processing chassis 150 through one or more connections, such as an RS-422 or Ethernet connection.

Output from the communication manager 220 is routed to variety of interfaces, such as a wideband, and narrow band beyond line-of-sight (WB and NB BLOS SATCOM), wideband and narrow band line-of-sight satellite communications (WB and NB LOS SATCOM) interface 264, one or more wideband line-of-sight common data links (WB LOS CDL) 266a, 266b, a military intelligence data system for tracking landed vehicles 332, telephony, etc., cross-links and airborne communication relay (ACR) that can be dynamically reassigned by the communication manager 220. One in the field of intelligent and secure communications will appreciate that these interfaces are presented as examples only and that the interfaces need not be intelligent or secure.

An unmanned system will most likely be in communication with a remote mission command module or control system 320, such as located in fixed or mobile ground stations 142, 144 or naval systems 160, 162, 164, or other manned aircraft systems 122, 124 of FIG. 1 in that these entities share the same control system 320 or command module. In legacy systems, one such interface between the mission command 320 and the secure routing and communication architecture 110 within an unmanned environment may be a Serial Line Internet Protocol (SLIP), an older encapsulation of the Internet Protocol designed to work over serial ports and modem connections, as documented in RFC 1055. The mission command module or system 320 may have electronic and communication components, such as routers 326a, 326b, a bandwidth manager 328, one or more processing device(s) 324, data tracing modules 322, all or several of which may be tailored for custom operations. Interfaces from mission command 320 for communication to other systems and the secure routing and communication architecture 110 may include a radar interface 340, an EO/IR interface 342, a ESM 344, and/or an AIS 346, storage 350, as well as SAR/MTI, SIGINT, FOPEN interfaces (not shown).

In both commercial and military manned and unmanned environments, there may be a security encryptor/processor 250, an example of which is High Assurance Internet Protocol Encryptor (HAIPE). A HAIPE is a Type 1 encryption and routing device that allows two enclaves to exchange data over an untrusted or lower-classification network and complies with the National Security Agency's HAIPE Internet Protocol Specification. A HAIPE and other security processors look up the destination internet protocol address of a packet in its internal routing table and choose an encrypted tunnel or communication path based on that table. HAIPE IS is based on an internet protocol, but with additional restrictions and enhancements, including encryption of multicast data using a "preplaced key". Multicast means the delivery of information to a group of destinations simultaneously using the most efficient strategy to deliver the messages over each link of a network only once, creating copies only when the links to the destinations split. Multicast transmission and receipt requires loading the same cryptographic key on all HAIPE devices that will participate in the multicast session in advance of data transmission. The secure routing and communication architecture 110 supports HAIPE IS for routing protocols and open network management. Presently, HAIPE IS does not support routing protocols so the HAIPE must be preprogrammed with static routes which cannot be dynamically reassigned to respond to a changing network topology. The secure routing and communication architecture 110 enables this dynamic reassignment functionality for the HAIPE processors 250.

Figure 4:
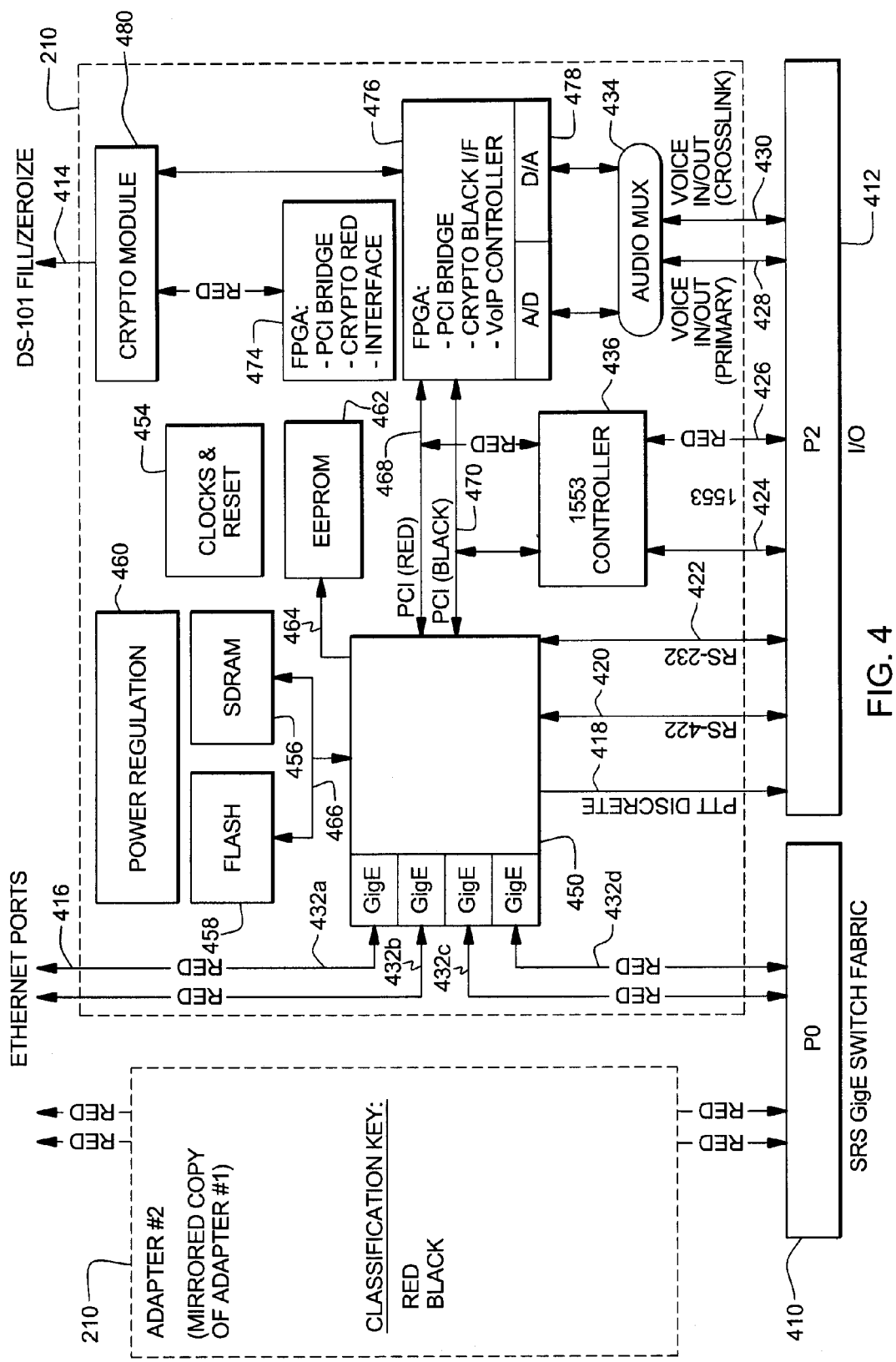
FIG. 4 is a block diagram of an embodiment of a trusted input/output module of the secure routing and communication architecture in an embodiment described herein. It is suggested that FIG. 4 be printed on the face of the patent.

FIG. 4 is a block diagram of an example of a generic trusted input/output module 210. Much of the functionality of the secure routing and communication architecture occurs not only within the communication manager 220, but also within a trusted input/output module 210. Preferably, one or more trusted input/output modules 210 are mounted within the secure chassis 150. Shown in FIG. 4 is one printed circuit board having two sides, each side implementing the full functionality of a trusted input/output module 210. In this embodiment, the trusted input/output module 210 may be implemented in unmanned vehicles for communication with satellites, ground based systems, manned vehicles, and ocean-going vessels, as in the global information grid 100. When implemented in a ground station, the input/output module 210 may communicate with unmanned and maimed aerial vehicles, satellites, other ground stations, and ocean-going vessels.

An important function of the trusted input/output module 210 is to ensure that data routed through the secure routing and communication architecture 110 is properly classified and that the security level of the data is properly maintained as the data is routed through the trusted input/output module 210. Shown in FIG. 4 are various electronic signal interfaces embodied in connectors 410, 412, 414, 416 of the trusted input/output module 210 for specific data protocols. The connectors are not necessarily implemented on a backplane but may be as shown. A P0 connector 410 may be used in some implementations to network with satellites, security processors such as HAIPEs, remote switches or routers using high speed serial connections. A P2 connector 412 may be used to connect to user-defined input/output; in this implementation the user-defined input/output interfaces may implement legacy protocols for communication with, e.g., a VHF/UHF radio communication system 240 of a plurality of ARC-210 radio transceivers. Data routed by way of the interfaces of a connector, such as the P2 connector 412, may comprise push-to-talk (PTT) discrete binary data 418, serial RS-422 420, serial RS232 422, two levels of 1553 data on a respective bus 424, 426, and analog voice interfaces 428, 430 having different security levels. There may an input port 414 to route control signal to zeroise the cryptographic key verification components of the input/output module 210 and the communication manager 110. There may also be direct Ethernet ports 416.

To facilitate transfer of these different kinds of data, there may be hardmacs or PHYs that are data transceiver and controller components for specific data transmission protocols, such as gigabit Ethernet and/or SPI4.2, an asynchronous transmission mode or any other proprietary or industry data transmission standard. Thus, the trusted input/output module 210 has at least and preferably more than one gigabit Ethernet PHYs 432a-432d to receive internet protocol data at a gigabit frequency. An audio multiplexer 434 may be included to crosslink incoming and outgoing audio data 428, 430 as controlled by the communication manager 220 without performing decryption of the data for control data link systems or for the radio transceiver system 240. The communication manager 220 is preferably connected to a trusted input/output module 210 via one of the Ethernet ports 416. There may also be a 1553-controller 436 within the trusted input/output module 210 to route serial data to/from a radio transceiver 240. Again, the reader is reminded that all the examples of protocols, data channels, and connectors are by way of example only; as other channels and protocols are used and may require other input/output interfaces.

Also shown in FIG. 4 is a processing unit 450 implemented especially for extremely fast signal conversion and routing within each trusted input/output module 210. Processing unit 450 may have some additional functions assigned to it by the communication manager 220. Processing unit 450 may be a commercial processor or an ASIC. Although only one processing unit 450 is shown in FIG. 4, multiple processing units 450 could be distributed and/or partitioned in various combinations between secure and unsecure or different levels of secure data channels depending upon security requirements and capabilities; for instance, processing unit 450 may be implemented as two processors, one for red data and one for black data. Processing unit 450 controls signal routing, encryption, and decryption of the data on its respective trusted input/output module 210. Processing unit 450 preferably executes a real-time operating system and the programs of the internet protocol conversion and sensitivity preservation and other applications. Processing unit 450 must also execute the logic to determine an appropriate route and may include the appropriate analog and digital interfaces to receive data from the connected systems and modules.

Processing unit 450 also has a complement of support chips as shown. Shown also is an erasable programmable nonvolatile read only memory (EEPROM) 462 for storing programs and nonvolatile data such as programs, routines, modules of the operating system necessary to "boot up." Synchronous dynamic random access memory (SDRAM) 456 and flash memory 458 may provide temporary storage of instructions and data during processing that are erased when the computer is powered down. The memories described in FIG. 4 are shown as individual monolithic components but it is well known that memory is often arranged in a hierarchy of caches and other memory devices, some or all of which may be integrated into the same semiconductor substrate as the processing unit 450 and or the communication manager 220. In addition, memory may include memory storage physically located remote from the secure routing and communication architecture 110, e.g., a cache memory in a processor or other storage capacity used as a virtual memory, a mass storage device 282, or other computer networks 286 shown in FIG. 2. A regulated power supply 460 is mounted on the trusted input/output module 210 to provide and regulate power to each of the components and modules, as is a component or module for clocks and reset 454. Communication busses 464, 466 are included for the transfer of data, commands and other information between the processing unit 450, such as internal bus 466 to its several memory units 456, 458 and/or another internal bus 464 connecting the processing unit 450 to EEPROM 462. While shown in simplified form, the busses may also be structured as multiple busses, such as connecting power 460, clocks and reset 454.

Connecting processing unit 450 with field programmable gate arrays 444, 446 are two or more busses 468, 470; in the embodiment shown, a PCI bus 468, 470 is connected to a respective field programmable gate array 474, 476 to provide a secure interface for a respective level of secure information. For instance, in the embodiment shown, line indicated by—RED—may indicate data having a high level of security that is kept separate for data having a lesser level of security. In some implementations, the field programmable gate arrays 476, 476, however, may not be connected to the processing unit 450; control will come from inside the field programmable gate array itself, either by hard coding control mechanisms or instantiating an internal processor element, as determined by requirements of security certification. At least one field programmable gate array 476 also provides analog and digital data conversion 478 for voice internet protocol through the voice/audio multiplexer 436. One (black) field programmable gate array 478 routes control and secure data flow between a cryptomodule 480 and the communication interfaces for voice input/output 478. Another (red) field programmable gate array 444 may route decrypted data flow between the cryptomodule 480 and the processing unit 450.

The processes to achieve internet protocol conversion and preserve the sensitivity level of the data received, routed through and transmitted by the secure routing and communication architecture are further described below with reference to flowchart illustrations and/or block diagrams of methods, apparatus (systems), components, and computer program products according to different embodiments described herein. It will be understood that each block of the flowchart illustrations and/or block diagrams, and combinations of blocks in the flowchart illustrations and/or block diagrams, can be implemented by computer program instructions. These computer program instructions may be provided as one or more components to a processor of a general purpose computer, special purpose computer, or other programmable data processing apparatus to produce a machine, such that the components, which execute via the processor of the computer or other programmable data processing apparatus, create means for implementing the functions/acts specified in the flowchart and/or block diagram block or blocks.

These computer program components for the internet protocol conversion and sensitivity preservation within the secure routing and communication architecture may also be stored in a computer-readable memory that can direct a computer or other programmable data processing apparatus to function in a particular manner, such that the components stored in the computer-readable memory produce an article of manufacture including components which implement the function/act specified in the flowchart and/or block diagram block or blocks. The computer program components may be loaded onto a computer or other programmable data processing apparatus to cause a series of operational steps to be performed on the computer or other programmable apparatus to produce a computer implemented process such that the components which execute on the computer or other programmable apparatus provide steps for implementing the functions/acts specified in the flowchart and/or block diagram block or blocks.

Communication manager 220 and/or processing unit 450 are capable of generating the computer program components embodying the programs to execute the internet protocol conversion and sensitivity preservation, and are capable of receiving and routing the program instructions embodying the modules and programs to execute the internet protocol conversion and sensitivity preservation. Further, the computer program components that execute the internet protocol conversion and security information and preservation may be connected to processing unit 450 and communication manager 220 from other devices across the network. Operating systems provide, inter alia, functions such as device interfaces, management of memory pages, management of multiple tasks, etc. as is known in the art. Examples of such operating systems may include LINUX, AIX, UNIX, Windows-based, Z/OS, V/OS, OS/400, an RTOS, a handheld operating system, etc. These operating systems and other various of the programs to execute the internet protocol conversion and preservation of security and other applications, other components, programs, objects, modules, etc. may also execute on one or more processors in another computer coupled to either or both the communication manager 220 or processing unit 450 via a network, e.g., in a distributed or client-server computing environment, whereby the processing required to implement the functions of a computer program components may actually be allocated to multiple processors over a network. Further, as can be seen from the flow charts of FIGS. 5-9, to the extent that these components are software components, they can also be programmed as objects in an object-oriented processing system.

In general, the computer program components that execute the internet protocol conversion and sensitivity preservation of the secure routing and communication architecture 110 within the communication manager 220, the processing unit 450 or other hardware or firmware components to implement the embodiments described herein, whether as part of an operating system or a specific application, component, program, object, module or sequence of instructions may be referred to herein as computer program components, software components or simply components. One of skill in the art will understand that the logic and processes of the software components may be implemented in a combination of or separately in hardware and software and firmware components. The components that execute the internet protocol conversion and sensitivity preservation typically comprise one or, more instructions that are resident at various times in various memory and storage connected to the communication manager 220 and the processing unit 450 such that when read and executed cause the secure routing and communication architecture 110 to perform the steps necessary to execute steps or elements embodying the various aspects described herein. The components to execute the internet protocol conversion and sensitivity preservation comprises a cryptographic key verification component that identifies and verifies the security level of the source and destination of the communication; a conversion component to convert the data from the protocol of the source to an internet protocol and then to convert the routed data in internet protocol to the protocol of the destination, an encryption component that wraps or encrypts the communication for tunneling within the secure routing and communication architecture, a routing component to route the communication to the proper interface for communication external to the secure routing and communication architecture, and more. The programs to execute the internet protocol conversion and sensitivity preservation may further comprise one or more other components as will be explained.

Also, however, the secure routing and communication architecture 110 may receive other inputs and route other outputs. For interface with a software developer or operator, secure routing and communication architecture 110 may be connected to one or more user input devices, e.g., a keyboard, a mouse, a trackball, a joystick, a touchpad, and/or a microphone, among others, and a display such as a CRT monitor, an LCD display panel, and/or a speaker, among others. It should be appreciated, however, that some embodiments of the secure routing and communication architecture, e.g., some server implementations might not support direct software developer input and output. A terminal interface and appropriate terminal applications may support the attachment of single or multiple terminals or laptop computers and may be implemented as one or multiple electronic circuit cards or other units. As mentioned, there may be internal and external data storage; external data storage may comprise one or more rotating magnetic hard disk drive units or a tape or optical drive. For additional storage, secure routing and communication architecture may also have memory comprising one or more mass storage devices, e.g., a floppy or other removable disk drive, a hard disk drive, a direct access storage device (DASD), an optical drive e.g., a compact disk (CD) drive, a digital video disk (DVD) drive, etc., and/or a tape drive, among others. One of skill in the art will further realize that many of the interfaces are wireless.

Furthermore, secure routing and communication architecture 110 preferably includes one or more internet protocol interfaces with one or more networks of the global information grid to permit the communication of information with other processing devices and databases coupled to the network(s). Network interface(s), as explained above, provide a physical and/or wireless connection for transmission of data to and from these networks and systems 110, 222, 322, such as those shown in FIGS. 1, 2, and 3. Network(s) may be the Internet, as well as any smaller self-contained network such as an Intranet, a wide area network (WAN), a local area network (LAN), or other internal or external network using, e.g., telephone transmissions lines, satellites, fiber optics, T1 lines, wireless, public cable, etc. and any various available technologies. One of ordinary skill in the art understands that secure routing and communication architecture 110 may be connected to more than one network simultaneously. Remote computer systems and entities to which the secure routing and communication architecture 110 may be connected may be desktop or personal computers, workstation, a minicomputer, a midrange computer, a mainframe computer, as well as the communication entities described with respect to FIG. 1. Any number of computers and other microprocessor devices, such as personal handheld computers, personal digital assistants, wireless telephones, etc., which may not necessarily have full information handling capacity as the large mainframe servers, may also be networked through network(s). Still yet, any of the components of the methods and program products shown in the embodiments of FIGS. 5-9 may be deployed, managed, serviced by a service provider who offers to perform the following services: receiving data, converting the data to an internet protocol, preserving the sensitive nature of the data, and then providing the data to an intended user whether the data be encrypted or not, and other process steps that the programs to execute the internet protocol conversion and sensitivity preservation or its other components can perform.

Furthermore, another embodiment contemplated is a computer program product on a computer-usable storage medium having computer-usable program components embodied in the medium to implement the processes and method steps described herein. Any suitable computer readable medium may be utilized including hard disks, CD-ROMs, optical storage devices, a transmission media such as those supporting the Internet or an intranet, wireless transmission, or magnetic storage devices. Computer program source code of the components for implementing the processes of the secure routing and communication architecture in accordance with a preferred mode described herein may be written in any computer programming language. Components having object code for implementing the processes for the secure routing and communication architecture preferably execute on one or more processing units within the architecture, although distributed computing is contemplated whereby components or modules of the computer program code may execute partly on the individual or backup server or client and partly on a remote server or client or entirely on the remote server or client connected to the secure routing and communication architecture.

Figure 5:
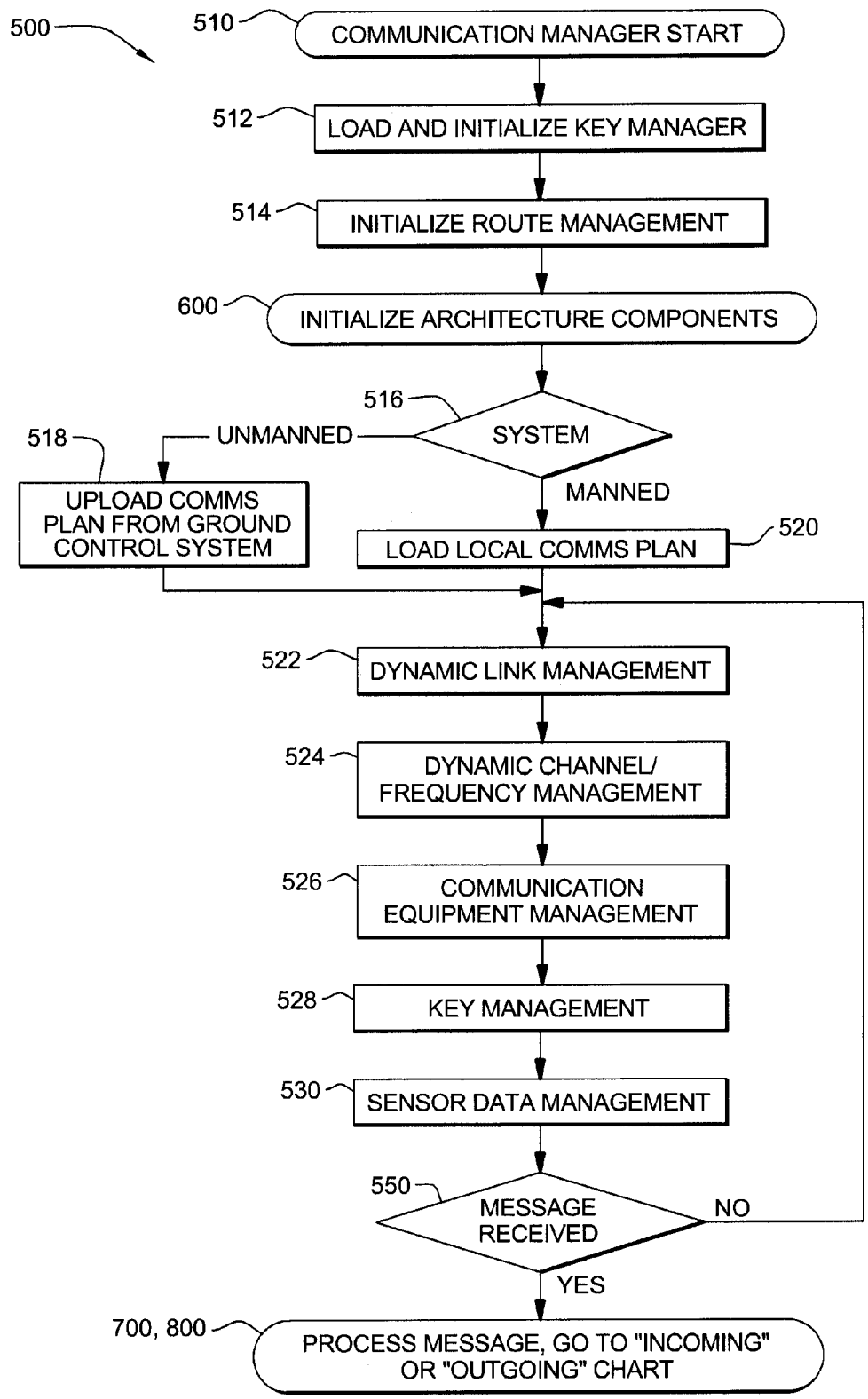
FIG. 5 is a block diagram of the processes implemented by software and hardware components by which the secure routing and communication architecture initializes.

FIGS. 5-9 provide the process steps of the secure routing and communication architecture 110 as it performs the functions of receiving data, converting the data to internet protocol, routing the data within the architecture, determining the protocol of the destination of the data and then converting the data to the destination's protocol, all while preserving the security level of the data. FIG. 5 provides the process steps of an initialization component 500 by which the communication manager 220 is initialized. In step 510, the communication manager is powered on, and in some instances there is always sufficient power for a cold start-up and a cold zeroisation function, as described. In step 512, the cryptographic key verification component is loaded into the communication manager 220 in order to test, generate, and read cryptographic keys associated with the data, sources and destinations of the data. In step 514, the route management component is initialized so that there can be dynamic routing of data to destination modules, systems and entities. The process then executes a second initialization component 600 that configures and initializes software and hardware components in the secure routing and communication architecture for data transfer.

Figure 6:
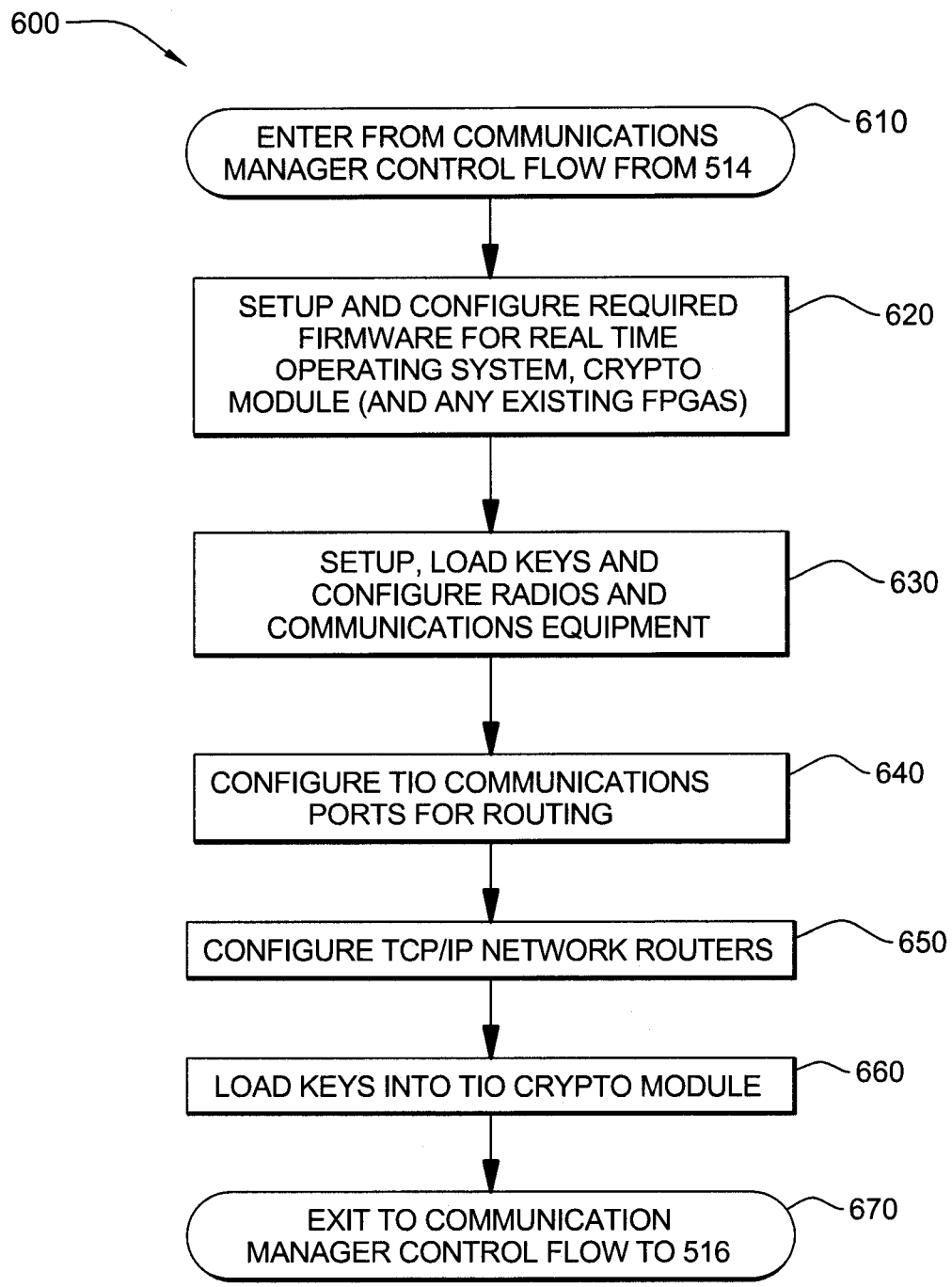
FIG. 6 is a block diagram representing the processes implemented by software and hardware components of the secure routing and communication architecture and of its communication manager configuring and initializing the secure routing and communication architecture in accordance with embodiments described herein.

FIG. 6 is a simplified flow chart of the configuration and initialization component 600 for the secure routing and architecture 110. In step 610, the configuration and initialization component 600 executes in the communication manager 220. In step 620, the real-time operating system of processing unit 450, cryptomodule 480 and the field programmable gate arrays 474, 476 are powered up and configured. In step 630, the actual external communication entities, such as the ARC-210 radios, and other entities in the global information grid 100 to and from which the secure routing and communication architecture 110 will transmit and receive messages receive control signals from the communication manager 220 to load cryptographic keys, if any, and configure these communication entities for the transmission and receipt of secure and/or unsecure data to/from the secure routing and communication architecture 110. In step 640, input/output ports, PHYs, and connection interfaces of the trusted input/output modules 210 are initialized and configured to be compatible with the communicating devices, systems, and entities of the global information grid 100 and other systems. Routers 230 and processing unit 450 are also configured in step 640. In step 660, respective cryptographic keys are loaded into the trusted input/output modules 210 for communication with the communicating devices, systems, and entities assigned to that particular key. Thus, to summarize the steps up to and including step 600 of FIGS. 5 and 6, components within the secure routing and communication architecture 110 are initialized and configured to exchange data of particular protocols and of particular security levels with connected communicating devices and systems. Upon initialization and configuration of the components and modules within the secure chassis 150, the process exits to step 516 of FIG. 5.

At this time, one of the interesting features of the secure routing and communication architecture 110 comes into play. Some communication entities have interconnected communicating components remote from each other but share the same control system, such as an unmanned aircraft 120 controlled by a mission command system 320. For purposes of routing and transmitting the messages, however, these entities that share the same control system are actually within a closed communication loop because the communications do not leave the realm of the control system. In step 516, the communication manager 220 determines which connected sources and which connected destinations actually share the same control system. For instance, in step 518, if both the transmitting and the receiving entity share the same control system and both are connected to the secure routing and communication architecture 110, such as between an unmanned vehicle 120 and its mission command system 320, then in step 518, communications management protocols and transmission plans are uploaded from mission command or control system 320. If the source and destination entities of the data do not share the same control system, such as an open communication loop between a satellite 112 or ground station 142, 144 and a manned aircraft 122, 124, the communication manager 220 loads communication management protocols and routing plans local to the architecture 110.

The communication manager 220 is available for one or more of the following functions comprising: dynamic link management as in step 522; dynamic channel and frequency management of step 524; communication equipment management 526; cryptographic key management 528; and sensor data management 530. The functions include updating the appropriate software and hardware components in mission control 320, or of security processors 250, or of processing units 450 and any other components on the trusted input/output module 210 should any links, channels, frequency, equipment, keys, sensors, etc. be added, removed, or updated. The communications manager 220 further determines if a message has been received, as in step 550. When data is detected within the secure routing and communication architecture 110, the communication manager 220 implements the method steps 700, 800 of FIGS. 7A, 7B and 8A, 8B.

Figure 7A:
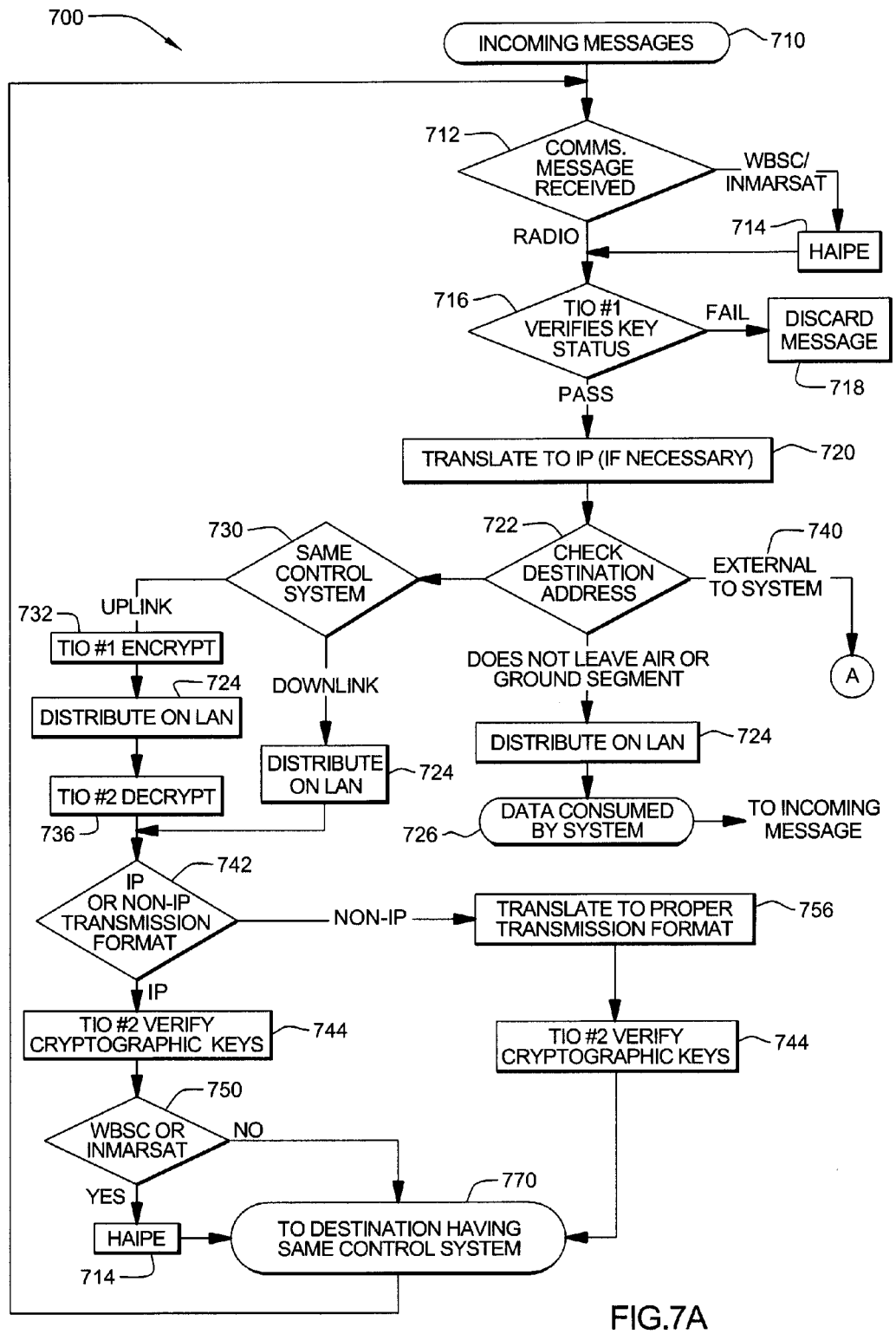
FIGS. 7A and 7B are block diagrams of the flow chart of the processes implemented by software and hardware components by which the secure routing and communication architecture processes incoming messages.
Figure 7B:
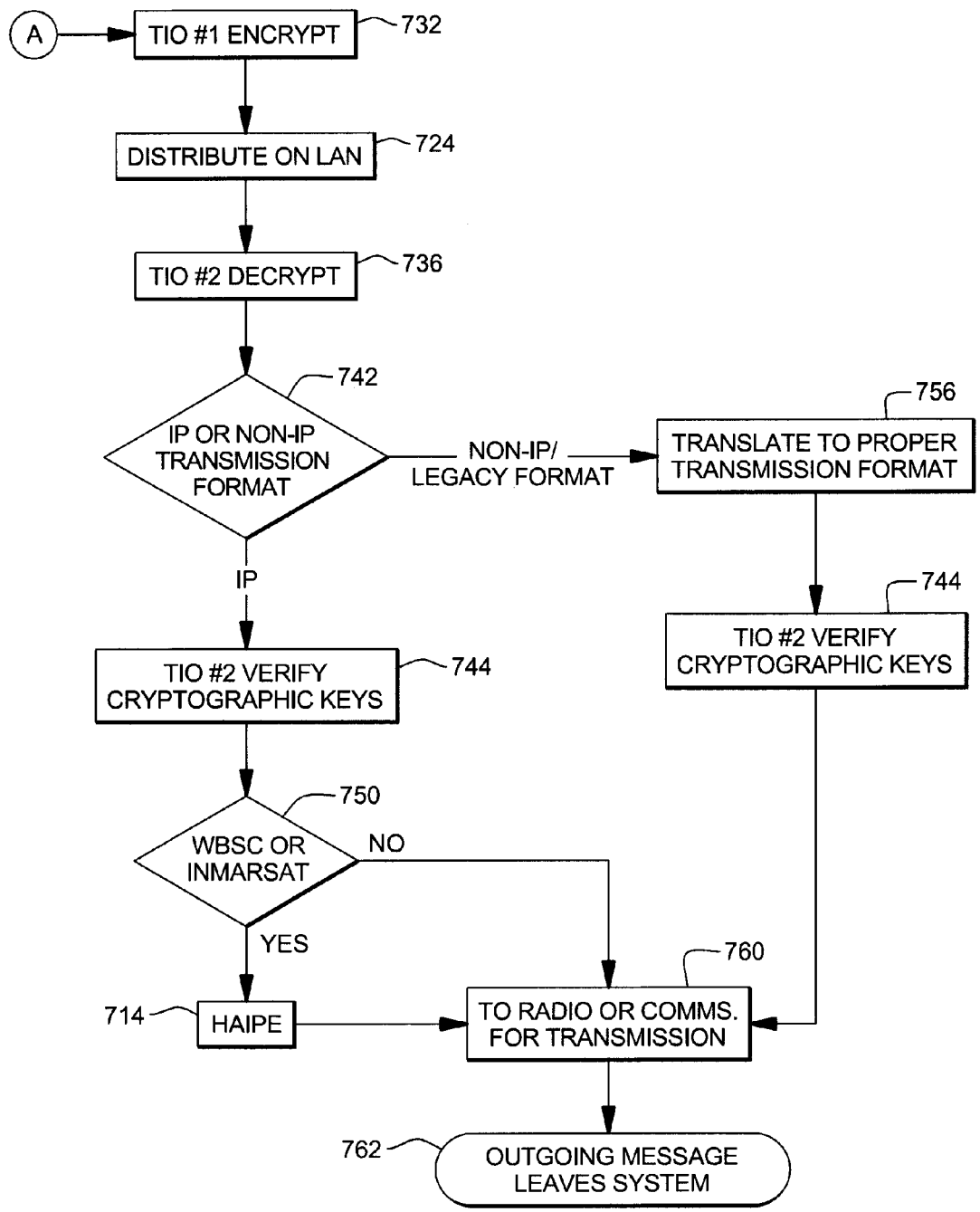

FIGS. 7A and 7B implement the processes of the hardware and software components of the secure routing and communication architecture 110 to receive and route incoming messages 700. This incoming message component 700 executes after step 550 of FIG. 5 when a message has been received in step 710. In step 712, a determination is made as to whether the received message is a wideband or narrowband satellite communication and if so, the message is routed in step 714 to a security processor 250, such as a HAIPE, for additional encryption verification and processing. If the message is a radio communication or other communications does not require security processing, because, e.g., that communication may already have an inherent and recognizable security protocol which must be preserved within the secure routing and communication architecture 110, the message is routed in step 716 to a first trusted input/output module 210 to verify the cryptographic keys of the source to confirm genuineness of the message. If the cryptographic keys of the source and destination do not agree with each other and with the cryptographic keys associated with the source and destination in the secure routing and communication architecture 110, the message is discarded in step 718. If, in step 716, the cryptographic keys are verified indicating the message is from a verified source and has an inherent and recognizable security level that must be preserved while routing through the secure routing and communication architecture, and if the message is not internet protocol, the conversion component converts the data to an internet protocol, in step 720.

In step 722, the routing component that may be executing within processor 450 or other components of the architecture 110 reads the destination address of the message and determines if the message is to be routed between entities sharing a same control system, such as between an unmanned aircraft and a ground control station in an air-to-ground communication or a ground-to-air communication. If the communication is an uplink routed through the secure routing and communication architecture, then as in step 730, the message is encrypted if necessary in the cryptomodule 480 to satisfy, for instance, a security policy to tunnel or wrap either unencrypted data or other encrypted data voice internet protocol and other data routed on the same local area network as inherently and recognizable secure encrypted communications, such as between a ground mission command 142, 320 and a unmanned aircraft 120. In step 724, the uploaded message is wrapped, i.e., locally encrypted within the receiving trusted input/output module 210, and routed through the local area network of the secure routing and communication architecture 110, i.e., tunneled, to another trusted input/output module 210 connected to the interface of the destination. In step 736, the message is decrypted or unwrapped when it exits the secure routing and communication architecture 110. Two things to keep in mind at this time: first, the message may have its own inherent and recognizable level of security independent of the wrapping, i.e., encryption by the first trusted input/output module 210—so that a feature of the secure routing and communication architecture is that the inherent and recognizable security level is preserved and protected for transmission over the LAN regardless of whether the transmitting and receiving entities share the same control system; and second, because of other features and components described herein, the message is converted to an internet protocol before it is routed over the LAN of the secure routing and communication architecture 110. If in step 730, the message is to be received by a destination entity not sharing the same control system as the source entity, the message is routed on the LAN of the secure routing and communication architecture 110.

In step 742, the protocol associated with the destination address is read within the second trusted input/output module 210 and the message is converted to the protocol of the destination. If the destination cannot receive an internet protocol communication in step 742, then in step 756, the conversion component converts the message from its internet protocol to that of the destination, e.g., an ARC-210 radio or an analog voice protocol, such as in the field programmable gate array 544 converting a digital voice signal to an analog voice signal in the a/d and d/a converters 546a, 546b. If the message has its own inherent and recognizable security level, the verification component within the second trusted input/output module 210 also verifies the cryptographic keys of the source, the message, and the destination in step 744 and if verified, secure message is routed to the appropriate interface for radio or a ground control station or to an unmanned aircraft sharing the same control system as the source of the communication, as in step 770.

If, in step 742, the destination address can receive an internet protocol transmission then in step 744, the second trusted input/output module verifies that the cryptographic keys of the source, the message, and the destination match in step 744, i.e., the source and destination agree and confirm that the message has its own inherent and recognizable security level and that the source and destination can transmit and receive this secure information. If so, then in step 750, when the particular internet protocol is a wideband or a narrowband satellite communication or other protocol processed by a security processor 250, such as a HAIPE, the message is processed in step 716 before it is routed to the appropriate interface for radio or communication of the secure message wherein the both the source and the destination are within a closed communication loop sharing the same control system, as in step 770.

Returning now to step 722 of FIG. 7A, if the destination is a module within the secure routing and communication architecture itself, such as destined for the communication manager 220 or a router 230 or other component, the message is routed on the local area network LAN of the secure routing and communication system in step 724 without tunneling (encryption) or wrapping by the trusted input/output module 210 and is then consumed within the secure routing and communication architecture 110 in step 726. Referring to FIG. 5, another example of this situation is when a message is received on an Ethernet port 512a of a trusted input/output module 210 and is output through a different Ethernet port 512b, 512c, 512d of the same trusted input/output module 210 connected to the destination.

Also at step 722 of FIG. 7A, the message may be transmitted to a destination entity having a different same control system than the source entity, as in step 740. With reference now to FIG. 7B, the message is first wrapped in step 732 but does not require verification of encryption keys by the receiving trusted input/output module 210 before routing in step 724 through the secure routing and communication architecture 110. Again, the wrapping or encryption satisfy a security policy by tunneling unclassified internet protocol data, such as voice, through the same components as data with an inherent and recognizable security level. When the message is routed to the trusted input/output module 210 associated with the destination interface in step 736, the transmission format of the destination is determined in step 742. If the destination receives transmissions in a non-internet protocol, then in step 756, the message is converted by components of the trusted input/output module 210 to the proper transmission format. In step 744, the transmitting trusted input/output module 210 verifies that the cryptographic keys, if any, correlate among the message, its source and its destination and the message is routed to an appropriate interface for transmission as in step 760 at which time, the message is said to be transmitted externally to an entity that does not share the same control system and the source of the communication, as in step 762.

Figure 8A:
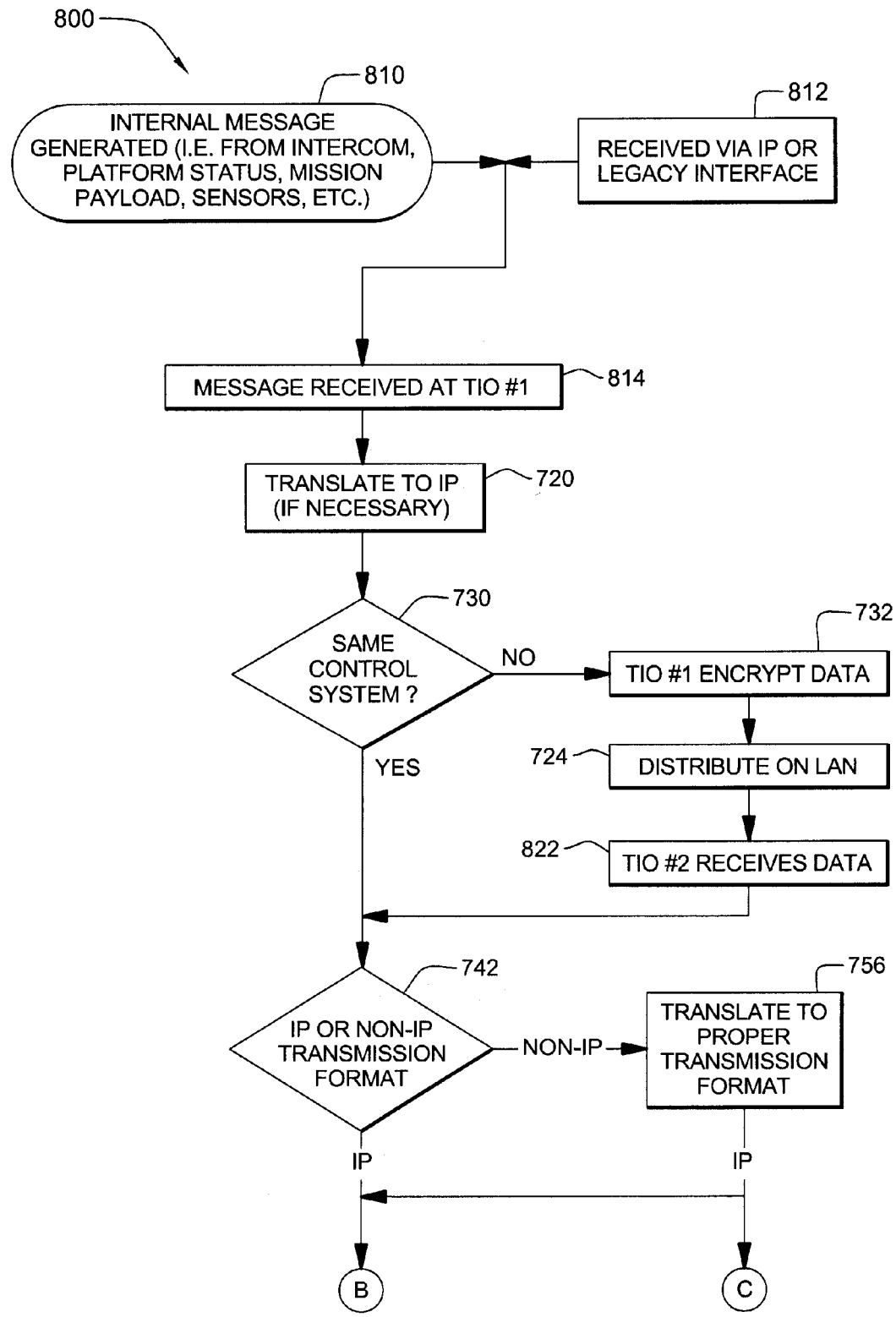
FIGS. 8A and 8B are block diagrams of the flow chart of the processes implemented by software and hardware components by which the secure routing and communication architecture processes outgoing messages.
Figure 8B:
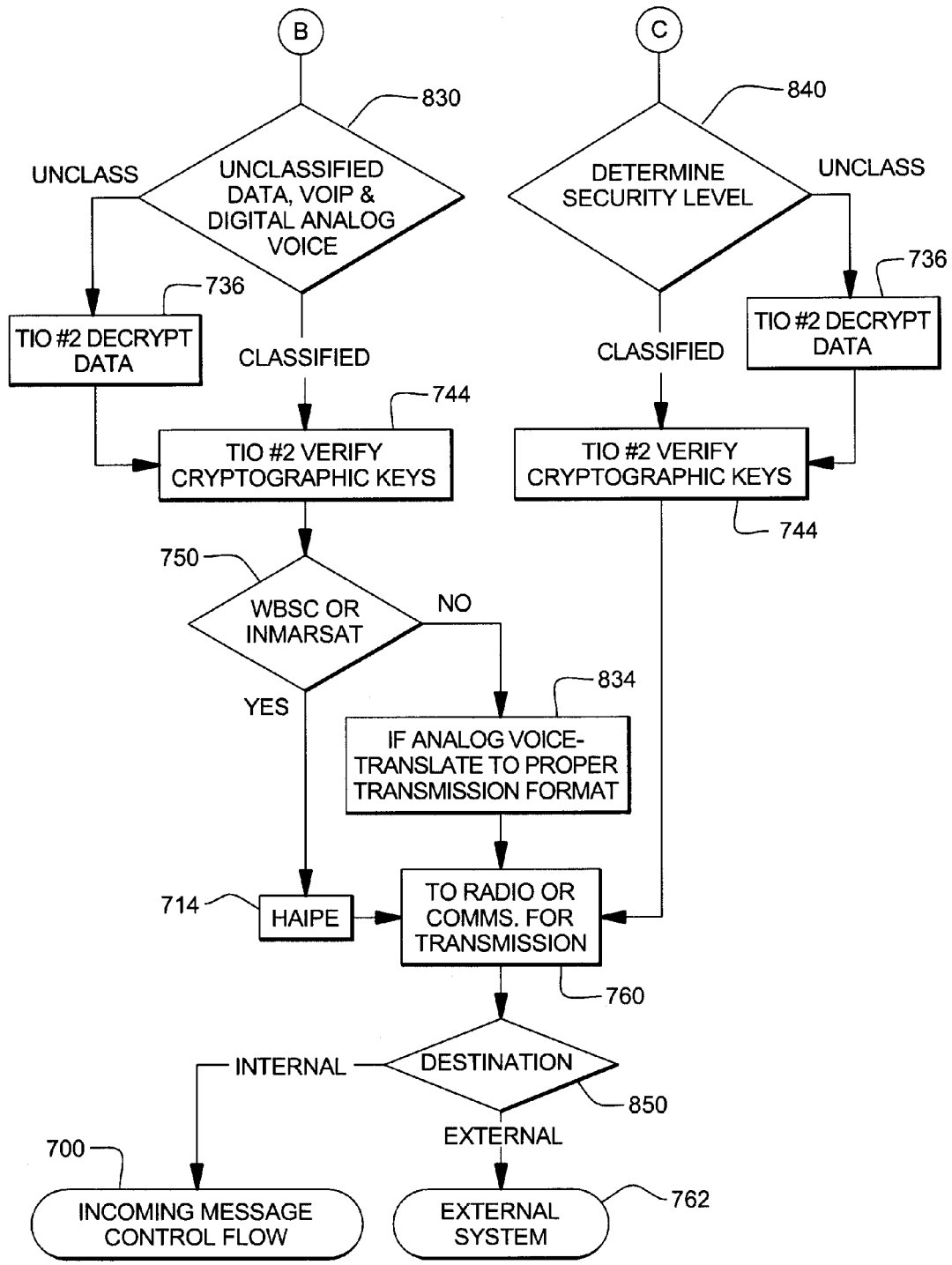

The process steps performed by components of the secure routing and communication architecture 110 for an incoming message are shown in FIGS. 8A and 8B. If the message received, now in internet protocol has its own inherent and recognizable security level independent of encryption or wrapping and tunneling through the secure routing and communication architecture 110, is to be transmitted to a destination not sharing the same control system as the source as in step 740, and if the destination can receive internet protocol data in step 742, then in step 744, the transmitting or second trusted input/output module verifies that the cryptographic keys of the source, the message, and the destination match. It is worth noting that the transmitting and the receiving trusted input/output module 210 may be the same module. If in step 750, the internet protocol message is also a wideband or narrowband satellite communication or other secure message requiring security processing, such as in a HAIPE, then the message is processed by the security processor in step 716. In any event, after the security processing in step 750 or if the message does not require security processing by, e.g., a HAIPE, in 750, the message is input to the interface for transmission as in step 760 at which time, the message is said is transmitted to an external destination that does not share the same control system and the transmitting entity, as in step 762.

Viewing FIGS. 8A and 8B, components 800 executing the process steps for an outgoing message are shown. In step 810, a message may be generated by an internal component or module of the secure routing and communication architecture 110 and needs to be transmitted. Another situation for processing an outgoing message occurs when the secure routing and communication architecture 110 shares the same control system as the destination of the communication, such as from an Intercom 262, or a sensor on an aircraft or a ground station, or from mission payload, or a status of the platform where there may be, e.g., mechanical difficulties on an aircraft, etc. Also in step 812, a message received and routed according to FIGS. 7A and 7B must now be processed for transmission. In step 814, the message is routed to a first trusted input/output module 210. If the message is not in internet protocol, the first trusted input/output module 210 converts the message to an internet protocol in step 720.

The destination of the message is determined in step 722 of FIG. 8A. If the destination entity does not share the same control system as the secure routing and communication architecture, the message is encrypted in step 732, routed on the LAN of the secure routing and communication architecture 110 to a transmitting trusted input/output module 210 associated with the destination, as in step 822.

If the destination entity as determined in step 722 shares the same control system as the secure routing and communication architecture 110, then transmitting trusted input/output module 210, or after the encrypted data has been routed to the transmitting trusted input/output module 210 as in step 822, the transmitting input/output module determines the data format of the destination entity, e.g., can the destination entity receive internet protocol data or not in step 742 of FIG. 8A. If the destination entity does not accept internet protocol, then in step 756, the conversion component converts the message to the destination entity's format, such as an analog radio or an analog voice format.

With respect to FIG. 8B, once the messages have been converted to internet protocol by the components of FIG. 8A, the secure routing and communication architecture 110 will proceed along path B of FIGS. 8A and 8B and at step 830 determine the security level of the data, voice internet protocol, and digital and analog voice data. If the message is unclassified, it is routed or tunneled to a second trusted input/output module 210 for decryption or unwrapping, as in step 736 of FIG. 8B. If the message is classified and has an inherent and recognizable security level of the message in step 830, the cryptographic key verification component of the second trusted input/output module 210 verifies the encryption keys of the source with the message with the destination. Then in step 750, if the internet protocol message is a wideband or narrowband satellite communication or other secure message requiring security processing, such as in a HAIPE, the message is processed by the security processor (HAIPE) in step 714. If the message is in analog voice protocol, in step 834, the message is converted to the communication protocol required by the destination. In any event, after security processing in step 714 or after the message is converted to analog voice protocol in step 834, the message is input to the interface for transmission as in step 760. The message may be transmitted to an entity that does not share the control system with the source as in step 762, or if the source and destination entities do share the same control system, then the message is routed to the process 700 of FIG. 7A wherein an incoming message is processed.

Returning to FIG. 8A, once the data has been translated to its proper transmission format in block 756, the process proceeds along path C to FIG. 8B. At block 840 of FIG. 8B, the security level of the message is determined. If the message is unclassified, it is routed or tunneled to a second trusted input/output module 210 for decryption or unwrapping, as in step 736 of FIG. 8B. If the message is classified and has an inherent and recognizable security level of the message in step 840, the encryption component of the second trusted input/output module 210 verifies the encryption keys of the source with the message with the destination in block 744 of FIG. 8B. Then, the routing component of the trusted input/output board 210 routes the message to the interface associated with the destination of the message. As above, the message may be transmitted to an entity that does not share the control system with the source as in step 762, or if the source and destination entities do share the same control system, then the message is routed to the process 700 of FIG. 7A wherein an incoming message is processed.

Figure 9:
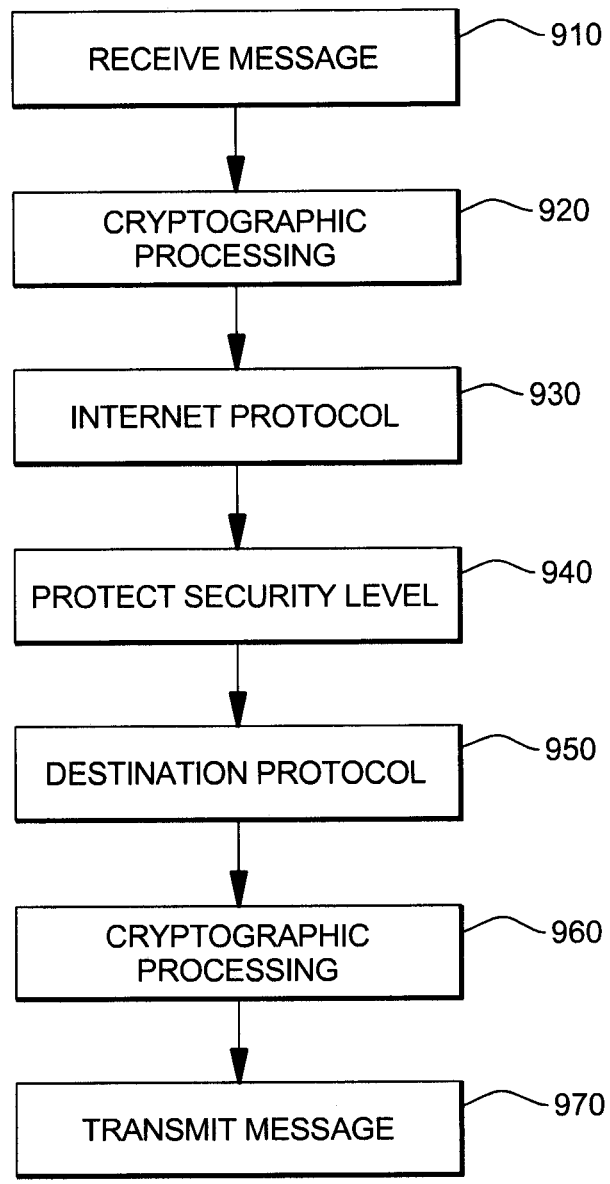
FIG. 9 is a simplified process chart of the processes performed by components of the secure routing and communication architecture in accordance with embodiments described herein.

What can be surmised from FIGS. 5-9 and as shown in FIG. 9 are the software and hardware components that perform similar actions in the secure routing and communication architecture 110. For example, there are software and hardware cryptographic component(s) 920, 960 that verify encryption keys of the source, the message, and the destination with cryptographic keys within the secure routing and communication architecture when the message has an inherent and recognizable security level. These cryptographic key verification components may further determine if the message requires additional security processing in a separate processor, such as a HAIPE. There are software and hardware conversion components 930 that determine if the incoming message is in an internet protocol, and if not, convert or translate that message, whatever its protocol, to an internet protocol. There are also software and hardware conversion component(s) 950 that translate an internet protocol message to a destination's protocol, such as satellite or radio communications. There are further software and hardware encryption components 940 that encrypt or wrap data for routing or tunneling through the local area network of the secure routing communication architecture and then decrypt or unwrap the communication for transmission. There are software and hardware interface or communication components 910, 970 that receive and transmit messages to and from communicating entities that may share a control system or not. There are, of course, routing components that route message along the LAN of the trusted input/output board and to other components through the secure routing and communication architecture.

Figure 10:
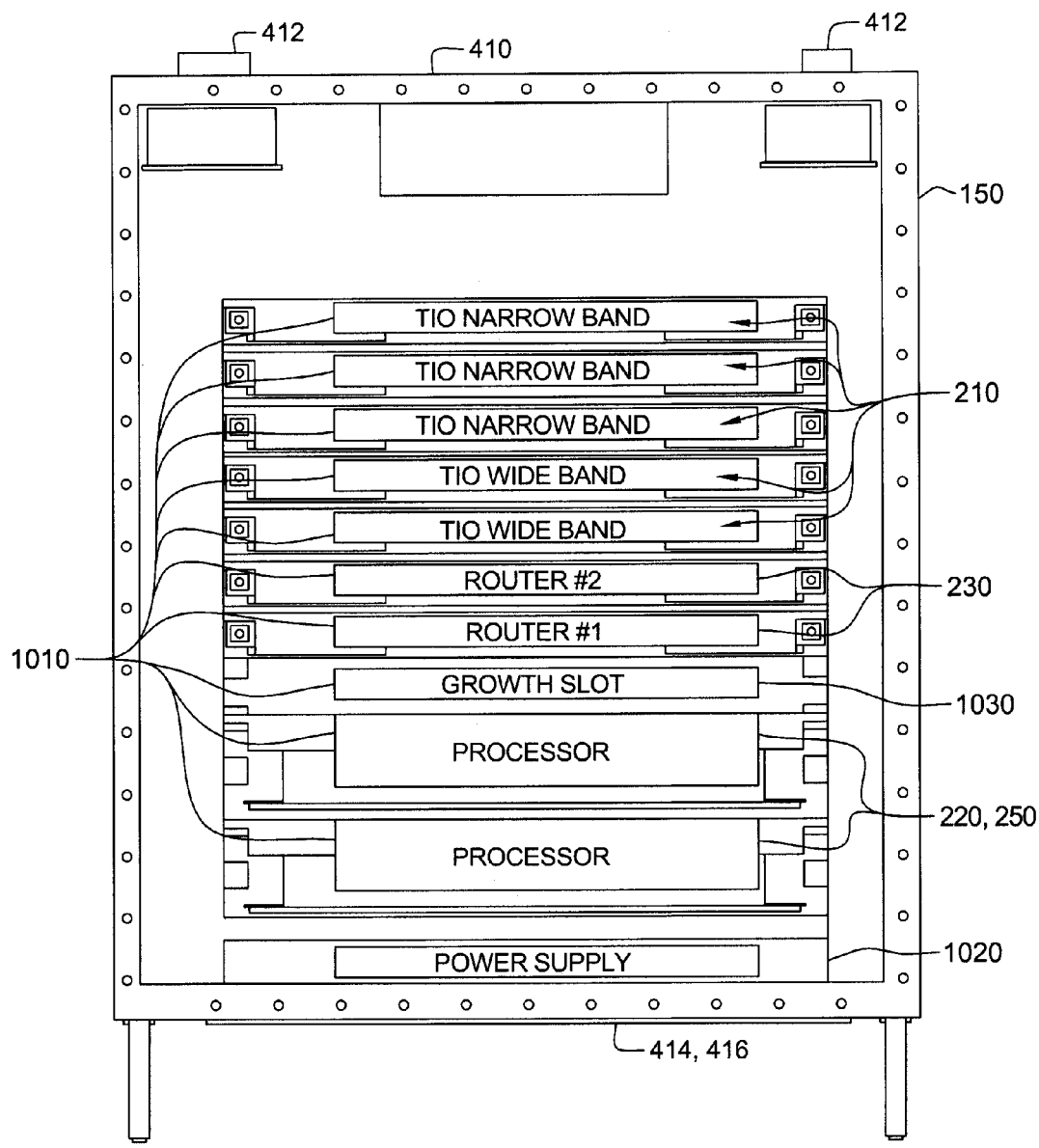
FIG. 10 a representation of a secure chassis implementing hardware and software components that can be used within the secure routing and communication architecture in accordance with embodiments described herein.

FIG. 10 is a representation of a secure chassis 150 embodying software and hardware components of the secure routing and communication architecture 110 as a plurality of circuit cards 1010. Consistent with FIG. 5, each circuit card 1010 may have a front and back side having the same or different hardware and software components, such as a card 1010 having one trusted input/output module 210 on one side of the circuit board 1010 and another trusted input/output module 1010 on the reverse side, each capable of addressing the same or different interfaces and/or protocols and/or inherent and recognizable security levels as described above. Circuit cards 1010 may further have one or more processing units, such as one or both a communications manager 220, or a security processor such as a HAIPE processor 250, or processor 450. Routers 230 may be mounted on circuit boards 1010 and may have multiple ports for routing the messages between the various trusted input/output boards 210, the various processors 220, 250, 450 and the various interfaces 410, 412, 414, 416. There may also be unused spaces 1030 for growth. Preferably, the secure chassis 150 and the hardware components within are radiation hardened and provided with electrostatic discharge, electromagnetic pulse protection and protection from the environment.

The secure routing and communication architecture 110 preferably complies with military standards for use within military frameworks and processes. By way of example only, the secure communications and routing system 110 can receive, route, and transmit data for IMINT, SIGINT, SAR/

MTI, FOPEN or other sensors. The secure routing and communication architecture 110, moreover, can receive, route, and transmit wideband SATCOM, narrowband SATCOM, e.g., INMARSAT and/or MUOS, wideband line-of-sight CDL and line-of-sight VHF/UHF radios to securely distribute sensor data and analog, digital and voice over internet protocol to other platforms and ground control segments. The wideband and narrowband SATCOM, and the CDL may be combined with the secure routing and communication architecture 110 for communication to SIPRNET and NIPRNET. The secure routing and communication architecture 110 enables internet protocol adaptability for several and newer versions of the latest, net-centric operations, interoperability, and global information grid connectivity standards and protocols arise. The secure routing and communication architecture 110 provides non-internet protocol to internet protocol adaptation so that disparate non-internet protocol enabled satellite terminals, telecom and tactical radios can interoperate over internet protocol networks. The secure chassis may have an integrated security processor, such as an HAIPE, that further enables secure BLOS WB and NB SATCOM communications and allows data of inherent and recognizable security and multiple levels of data (classified, unclassified, proprietary, etc.) including voice to be securely routed thereby preventing unauthorized over the air (OTA) transmissions. The secure routing and communication architecture 110 implements voice internet protocol (VoIP) technology that allows analog voice radios to communicate with networks having internet protocol. Interfaces of the secure routing and communication architecture 110 include push-to-talk discrete and digital to analog voice conversion for non-internet protocol enabled radios. The secure routing and communication architecture 110 supports simultaneous WBSC, NBSC, WBLOS and NBLOS links on a communication entity for data reporting and dissemination to the ground mission command system and to external users. The trusted input/output modules 210 manage security to and from all data links and feature encryption that supports tunneling unclassified, proprietary, etc. data through classified networks. As discussed, the secure routing and communication architecture 110 has flexible local area network interconnectivity that enables data and voice relay.

The modular approach of the secure routing and communication architecture 110, moreover, allows rapid and inexpensive infrastructure changes as legacy radios and systems evolve towards internet-protocol. Presently, the secure routing and communication architecture supports gigabit Ethernet internet protocols for multiple local area network connections, e.g., flight, mission, radios, etc., but as communications protocols change and speed increases, the hardware modular and software component nature of the secure routing and communication architecture ensure easy and inexpensive updating.

Safety and security are constantly monitored and addressed through redundant local area networks, routers and communications managers as well as the multiple communication links. The flexible secure routing and communication architecture 110 with its communications manager 220 selects the best available links and manages operating data rates to ensure that the reliability and availability of the aircraft data and voice communication links are at a maximum whether at mission planning or throughout dynamic mission operations. The potential impact for non-deterministic delivery of the mission or flight data is minimized by logically separating mission data from flight management data until they must be combined in the data links. Priority is given to flight data through quality of service features of communication manager 220. Security is enhanced by the trusted input/output modules that coordinate with the communications manager to verify the security settings of the data links to ensure adequate classification level prior to forwarding or receiving data to or from a link. The secure chassis 150 may also have security processors 250, such as HAIPE encryption processors, for wideband satellite communication (WBSC) and narrow band satellite communication (NB SATCOM INMARSAT) links that do not have inherent and recognizable cryptographic features.

It will be appreciated that variations of some elements are possible to adapt the embodiments described herein for specific conditions or functions. The concepts presented herein may be further extended to a variety of other applications that are clearly contemplated as being within the scope described herein. Having thus described the preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A routing module, comprising:
a plurality of data transfer interfaces for receiving and transmitting data in a plurality of data transfer protocols, at least one data transfer interface corresponding to each of the plurality of data transfer protocols, wherein one of the plurality of data transfer interfaces is a non-internet based data transfer interface that is configured to receive data in a non-internet based data transfer protocol;
a cryptographic key component connected to one of the plurality of data transfer interfaces, the cryptographic key component configured to verify a security classification level of data received by the routing module and preserve separation of first level classified data and second level classified data routed through the routing module;
an encryption component connected to the cryptographic key component and to one of the plurality of data transfer interfaces, the encryption component configured to encrypt the data received by the routing module for routing through the routing module; and
a conversion component connected to the cryptographic key component, the encryption component, and one of the plurality of data transfer interfaces, the conversion component configured to convert the data received by the non-internet based data transfer interface in a non-internet based data transfer protocol to an internet based data transfer protocol for routing through the routing module.

2. The routing module of claim 1, wherein the conversion component and the encryption component are provided in a computer processor unit connected to the cryptographic key component via a bus.

3. The routing module of claim 1, wherein one of the plurality of data transfer protocols is a satellite communication protocol.

4. The routing module of claim 1, wherein one of the plurality of data transfer protocols is a UHF-VHF radio communication protocol.

5. The routing module of claim 1, wherein one of the plurality of data transfer protocols is a digital data protocol.

6. The routing module of claim 1, wherein one of the plurality of data transfer protocols is voice interne protocol.

7. The routing module of claim 1, wherein one of the plurality of data transfer protocols is analog voice protocol.

8. The routing module of claim 1, wherein one of the plurality of data transfer protocols is push-to-talk discrete protocol.

9. The routing module of claim 1, wherein one of the plurality of data transfer protocols is common data link protocol.

10. The routing module of claim 1, wherein the first level classified data is unclassified data.

11. The routing module of claim 2, wherein the computer processor unit has a real-time operating system.

12. The routing module of claim 2, wherein the cryptographic key component further comprises a field programmable gate array connected to the computer processor unit.

13. The routing module of claim 2, further comprising:
a memory unit connected to the computer processor unit for storage of data, a conversion algorithm, and a cryptography algorithm; and
a power regulation module and a clock/reset module to distribute power, clocks, and reset signals to one or more components in the routing module and to one of the plurality of data transfer interfaces.

14. The routing module of claim 2, wherein the computer processor unit includes a first processor that is configured to process only the first level classified data, and a second processor that is configured to process only the second level classified data.

15. The routing module of claim 12, further comprising an analog/digital converter connected between the field programmable gate array and one of the plurality of data transfer interfaces.

16. The routing module of claim 12, wherein the cryptographic key component further comprises a cryptomodule having logic to identify and distinguish between classified and unclassified data transfer protocols, the cryptomodule connected to the field programmable gate array.

17. The routing module of claim 15, wherein the plurality of data transfer interfaces includes an analog voice data transfer interface configured to receive data in an analog voice data transfer protocol, and
data received from the analog voice data transfer interface is converted by the conversion component to a voice internet data transfer protocol by the conversion component for routing through the routing module.

18. The routing module of claim 15, wherein the plurality of data transfer interfaces includes an internet voice data transfer interface configured to receive data in an internet voice data transfer protocol, and
data received from the internet voice data transfer interface is converted by the conversion component to an analog voice data transfer protocol for transmission out of the routing module via an analog voice data transfer interface.

19. The routing module of claim 15, further comprising a multiplexer connected between the analog/digital converter and one of the plurality of data transfer interfaces.

20. The routing module of claim 16, wherein the cryptomodule is configured to encrypt data passing through the cryptographic key component.

21. An input/output module for routing and communicating data, comprising:
a plurality of data transfer interfaces including an internet based data transfer interface and a non-internet based data transfer interface, wherein the internet based data transfer interface is configured to receive and transmit data in an internet based data transfer protocol and the non-internet based data transfer interface is configured to receive and transmit data in a non-internet based data transfer protocol;
a first data transfer protocol converter connected to one of the plurality of data transfer interfaces, the first data transfer protocol converter configured to convert data from a non-internet based data transfer protocol to an internet based data transfer protocol;
a cryptographic key identifier connected to one of the plurality of data transfer interfaces, the cryptographic key identifier configured to determine, verify, and preserve a security level of a classified data transfer protocol received and transmitted by one of the plurality of data transfer interfaces;
an encryptor connected to one of the plurality of data transfer interfaces, the encryptor configured to encrypt data for routing through the input/output module;
a decryptor connected to one of the plurality of data transfer interfaces, the decryptor configured to decrypt data;
a second data transfer protocol converter connected to one of the plurality of data transfer interfaces, the second data transfer protocol converter configured to convert data from an internet based data transfer protocol to a non-internet based data transfer protocol.

22. The input/output module of claim 21, further comprising a microprocessor connected to one of the plurality of data transfer interfaces, the microprocessor including the first data transfer protocol converter, the second data transfer protocol converter, the encryptor, and the decryptor.

23. The input/output module of claim 21, further comprising a cryptomodule connected to a field programmable gate array, both comprising logic for the cryptographic key identifier, and both connected to one of the plurality of data transfer interfaces.

24. The input/output module of claim 22, wherein the microprocessor preserves the separation of first level classified data and second level classified data routed through the input/output module.

25. The input/output module of claim 23, wherein the field programmable gate array is logically separated into a secure portion to preserve the security level of classified source or destination data transfer protocols having an inherent and recognizable security level.

26. The input/output module of claim 23, further comprising an analog/digital converter connected between the field programmable gate array and one of the plurality of data transfer interfaces, the analog/digital converter configured to receive and transmit data via an analog data transfer protocol.

27. The input/output module of claim 24, wherein the first level classified data is unclassified data.

28. The input/output module of claim 25, wherein the field programmable gate array is logically separated into a second portion to preserve the security level of unclassified source or destination data transfer protocols.

29. The input/output module of claim 28, further comprising a secure bus connecting the secure portion of the field programmable gate array to a microprocessor, and a second bus connecting the second portion of the field programmable gate array to the microprocessor.

* * * * *